US012639383B2

(12) United States Patent
Jalasutram et al.

(10) Patent No.: US 12,639,383 B2
(45) Date of Patent: *May 26, 2026

(54) PRESENTING RELATED CONTENT WHILE BROWSING AND SEARCHING CONTENT

(71) Applicant: Google LLC, Mountain View, CA (US)

(72) Inventors: Srikanth Jalasutram, San Francisco, CA (US); Jia Sin Lua, San Mateo, CA (US); Damon Chizuru Kawamoto, Santa Cruz, CA (US); Jeffrey Allen Shaffer, Portland, OR (US); Jacob Francis Contreras, San Francisco, CA (US); Maurice Kenji Clarke, Oakland, CA (US); Ryan Michael Henbest, San Francisco, CA (US); Chengcheng Wang, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/963,347

(22) Filed: Nov. 27, 2024

(65) Prior Publication Data

US 2025/0156491 A1     May 15, 2025

Related U.S. Application Data

(63) Continuation of application No. 18/081,832, filed on Dec. 15, 2022, now Pat. No. 12,189,700.
(Continued)

(51) Int. Cl.
G06F 16/9535      (2019.01)
G06F 16/953       (2019.01)
(Continued)

(52) U.S. Cl.
CPC ........ *G06F 16/9535* (2019.01); *G06F 16/955* (2019.01); *G06F 16/957* (2019.01)

(58) Field of Classification Search
None
See application file for complete search history.

(56) References Cited

U.S. PATENT DOCUMENTS 8,667,416 B2 * 3/2014 England .................. G06F 9/451
                                                              715/781
9,378,283 B2 * 6/2016 Batraski .............. G06F 16/9538
(Continued)

FOREIGN PATENT DOCUMENTS

JP          2015187885          10/2015

OTHER PUBLICATIONS

International Search Report and Written Opinion for PCT/US2023/031031, mailed on Jan. 3, 2024, 13 pages.

*Primary Examiner* — Debbie M Le
(74) *Attorney, Agent, or Firm* — DORITY & MANNING P.A.

(57) ABSTRACT

Systems and methods for presenting an interface for additional content suggestion can include obtaining data descriptive of the displayed content and determining additional content associated with the displayed content. An interface can then be provided that displays data associated with the displayed content and the additional content. The interface can include a first viewing window for displaying a portion of the displayed content and a second viewing window for displaying a snippet associated with the additional content.

20 Claims, 23 Drawing Sheets

Related U.S. Application Data

(60) Provisional application No. 63/410,433, filed on Sep. 27, 2022.

(51) Int. Cl.
 G06F 16/955 (2019.01)
 G06F 16/957 (2019.01)

(56) References Cited

U.S. PATENT DOCUMENTS

| | | | |
|---|---|---|---|
| 10,803,140 B1 | 10/2020 | Morris | |
| 11,783,003 B2 * | 10/2023 | Yushkina | G06F 16/955 |
| | | | 715/234 |
| 11,836,439 B2 | 12/2023 | Andersen et al. | |
| 2010/0241968 A1 | 9/2010 | Tarara et al. | |
| 2010/0268699 A1 | 10/2010 | Naam | |
| 2011/0252359 A1 | 10/2011 | England et al. | |
| 2014/0164401 A1 | 6/2014 | Kyaw et al. | |
| 2022/0237237 A1 * | 7/2022 | Odobetskiy | G06F 3/0482 |
| 2022/0309055 A1 * | 9/2022 | Srinivasan | H04L 67/02 |
| 2023/0144009 A1 | 5/2023 | Andersen et al. | |
| 2024/0311697 A1 | 9/2024 | Sharifi et al. | |

* cited by examiner

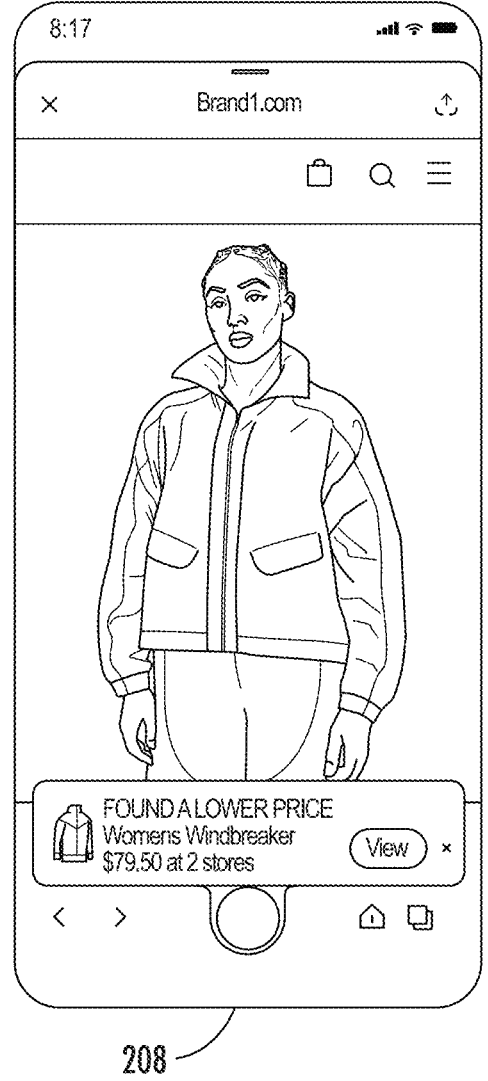

8:17

×     Brand1.com

FOUND A LOWER PRICE
Womens Windbreaker
$79.50 at 2 stores    View   ×

208

9:41

CompanyX.com

Sign up for emails and save! Be the first to know about new products, deals and more.

Product Insights    About the source    Safety report

Model 2 Air
Purifier Replacement Filter Set
for 400/400S
4.6 ★★★★★ (49)

Pros: Long lasting - Well made

⬚ Track product

Review: The Office Friendly
Model 400 Air
Purifier

The model 400 is a smart air
purifier designed for rooms up to 1560
sq. ft. Whisper quiet and perfect for
large rooms and office spaces. Read...

○ cleanup.expert - Jan 7 2022

6 Reviews
2022 (300, 400s, AP-1512HH,
250, 150) - airfuji.com

1502    OBTAIN CONTENT DATA

1504    DETERMINE ADDITIONAL CONTENT ASSOCIATED WITH
THE DISPLAYED CONTENT

1506    PROVIDE AN INTERFACE FOR VIEWING DATA ASSOCIATED WITH
THE DISPLAYED CONTENT AND THE ADDITIONAL CONTENT

1600

1602 — OBTAIN CONTENT DATA

1604 — PROCESS THE CONTENT DATA WITH A MACHINE-LEARNED MODEL TO GENERATE A MACHINE-LEARNED OUTPUT

1606 — DETERMINE ADDITIONAL CONTENT ASSOCIATED WITH THE DISPLAYED CONTENT BASED ON THE MACHINE-LEARNED OUTPUT

1608 — PROVIDE AN INTERFACE FOR VIEWING DATA ASSOCIATED WITH THE DISPLAYED CONTENT AND THE ADDITIONAL CONTENT

1700

1702 OBTAIN CONTENT DATA

1704 PROCESS THE CONTENT DATA TO DETERMINE AN ENTITY ASSOCIATED WITH THE DISPLAYED CONTENT

1706 DETERMINE ADDITIONAL CONTENT ASSOCIATED WITH THE DISPLAYED CONTENT BASED ON THE ENTITY

1708 PROVIDE AN INTERFACE FOR VIEWING DATA ASSOCIATED WITH THE DISPLAYED CONTENT AND THE ADDITIONAL CONTENT

PRESENTING RELATED CONTENT WHILE BROWSING AND SEARCHING CONTENT

RELATED APPLICATIONS

This application is a continuation of U.S. patent application Ser. No. 18/081,832, filed Dec. 15, 2022, which claims priority to and the benefit of U.S. Provisional Patent Application No. 63/410,433, filed Sep. 27, 2022. Applicant claims priority to and the benefit of each of such applications and incorporate all such applications herein by reference in its entirety.

FIELD

The present disclosure relates generally to presenting additional content based on a presently displayed content. More particularly, the present disclosure relates to obtaining data indicative of the displayed content being provided, determining additional content associated with the displayed content, and providing an interface with data associated with the displayed content and the additional content.

BACKGROUND

In viewing content items such as web pages, a user can be reading through and/or viewing only a small portion of the information provided on a topic. Additionally, the information may be out-of-date and/or might not be the most reliable information. Alternatively and/or additionally, a user may want to better understand the information and/or interact with the information; however, the user may be limited to manually performing additional searches and/or bookmarking the web page.

Articles and other content items can be lengthy and/or may discuss tangential topics merely in passing. The length and/or the lack of full context can cause additional hurdles for readers that may lead to further searches and can be time consuming.

SUMMARY

Aspects and advantages of embodiments of the present disclosure will be set forth in part in the following description, or can be learned from the description, or can be learned through practice of the embodiments.

One example aspect of the present disclosure is directed to a computing system for content prediction. The computing system can include one or more processors and one or more non-transitory computer-readable media that collectively store instructions that, when executed by the one or more processors, cause the computing system to perform operations. The operations can include obtaining content data. The content data can include an indication of a displayed content provided for display to a user. The operations can include determining additional content associated with the displayed content. The additional content can be obtained based on the content data. In some implementations, the additional content can be determined by processing the content data during a presentation of the displayed content. The operations can include providing an interface for viewing data associated with the displayed content and the additional content in response to determining additional content associated with the displayed content. The interface can include a suggestion state. The suggestion state can include a viewing window that displays at least a portion of the displayed content. The suggestion state can include a suggestion interface element that indicates the determination of the additional content.

In some implementations, the displayed content can be associated with a web page. The content data can include a uniform resource locator. The interface can include a web page viewer and a preview bubble. In some implementations, the web page viewer can provide a portion of the displayed content for display. The preview bubble can provide a snippet associated with the additional content. The interface can include a scroll indicator and a bubble interface element. In some implementations, the scroll indicator can indicate a position of a currently viewed portion of the displayed content with respect to other portions of the displayed content. The bubble interface element can be provided in the interface adjacent to the scroll indicator. The additional content can include a purchase link. The purchase link can be associated with a product associated with the displayed content. In some implementations, the additional content can include an augmented reality experience. The interface can include a selectable user interface element for providing the augmented reality experience.

In some implementations, the operations can include providing a suggestion interface element for display in a first state. The suggestion interface element can be descriptive of whether additional content has been determined. The operations can include providing the suggestion interface element for display in a second state in response to determining the additional content associated with the displayed content. The second state can be descriptive of the additional content being determined. In some implementations, the operations can include obtaining input data. The input data can be descriptive of a selection of a suggestion interface element of the interface. The operations can include providing a portion of the additional content for display.

In some implementations, determining the additional content associated with the displayed content can include determining a uniform resource locator associated with the displayed content and determining an additional web page associated with the uniform resource locator. Determining the additional content associated with the displayed content further can include generating additional content based on the additional web page. In some implementations, determining the additional content associated with the displayed content can include determining a plurality of additional resources associated with the displayed content, determining a plurality of predicted actions associated with one or more resources of the plurality of additional resources, and generating a plurality of action interface elements. The plurality of action interface elements can be associated with the plurality of predicted actions. The plurality of action interface elements can be provided for display in the interface.

In some implementations, determining the additional content associated with the displayed content can include processing at least a portion of the displayed content with a machine learned model to determine a machine-learned output and determining the additional content based on the machine-learned output. The interface can include a swipe-up interface element configured to display a portion of the additional content based on a user input.

In some implementations, providing the interface for viewing data associated with the displayed content and the additional content can include providing at least a portion of the displayed content for display with a suggestion interface element, obtaining a selection of the suggestion interface element, and providing at least a portion of the additional content for display. The operations can include processing a portion of the displayed content to generate semantic data. The semantic data can be descriptive of a semantic understanding of the portion of the displayed content. The operations can include querying a database based at least in part on the semantic data. The additional content can be determined based on the querying of the database.

In some implementations, the interface can include a type indicator associated with an content type of the additional content. The type indicator can be descriptive of action type. The additional content can be associated with performing a particular action. In some implementations, the type indicator can be descriptive of an understanding type. The additional content can provide supplementary information for understanding a particular topic associated with the displayed content.

Another example aspect of the present disclosure is directed to a computer-implemented method for providing additional content. The method can include obtaining, by a computing system including one or more processors, content data. The content data can include an indication of a displayed content provided for display to a user. The method can include processing, by the computing system, the content data with a machine-learned model to generate a machine-learned model output. The machine-learned output can be descriptive of a semantic understanding of the displayed content. The method can include determining, by the computing system, additional content associated with the displayed content based on the machine-learned model output. In some implementations, the additional content can be obtained based on the content data. The additional content can be determined by processing the content data during a presentation of the displayed content. The method can include providing, by the computing system, an interface for viewing data associated with the displayed content and the additional content in response to determining additional content associated with the displayed content. The interface can include a viewing window that displays at least a portion of the displayed content. In some implementations, the interface can include a suggestion notification descriptive of the additional content.

Another example aspect of the present disclosure is directed to one or more non-transitory computer-readable media that collectively store instructions that, when executed by one or more computing devices, cause the one or more computing devices to perform operations. The operations can include obtaining content data. The content data can include an indication of a displayed content provided for display to a user. The operations can include processing the content data to determine an entity associated with the displayed content. The operations can include determining additional content associated with the displayed content based on the entity. The additional content can be obtained based on the content data. In some implementations, the additional content can be determined by processing the content data during a presentation of the displayed content. The operations can include providing an interface for viewing data associated with the displayed content and the additional content. The interface can include a viewing window that displays at least a portion of the displayed content. In some implementations, the interface can include a suggestion notification descriptive of the additional content.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 2A-2B depict illustrations of an example interface according to example embodiments of the present disclosure.

Figure 1:
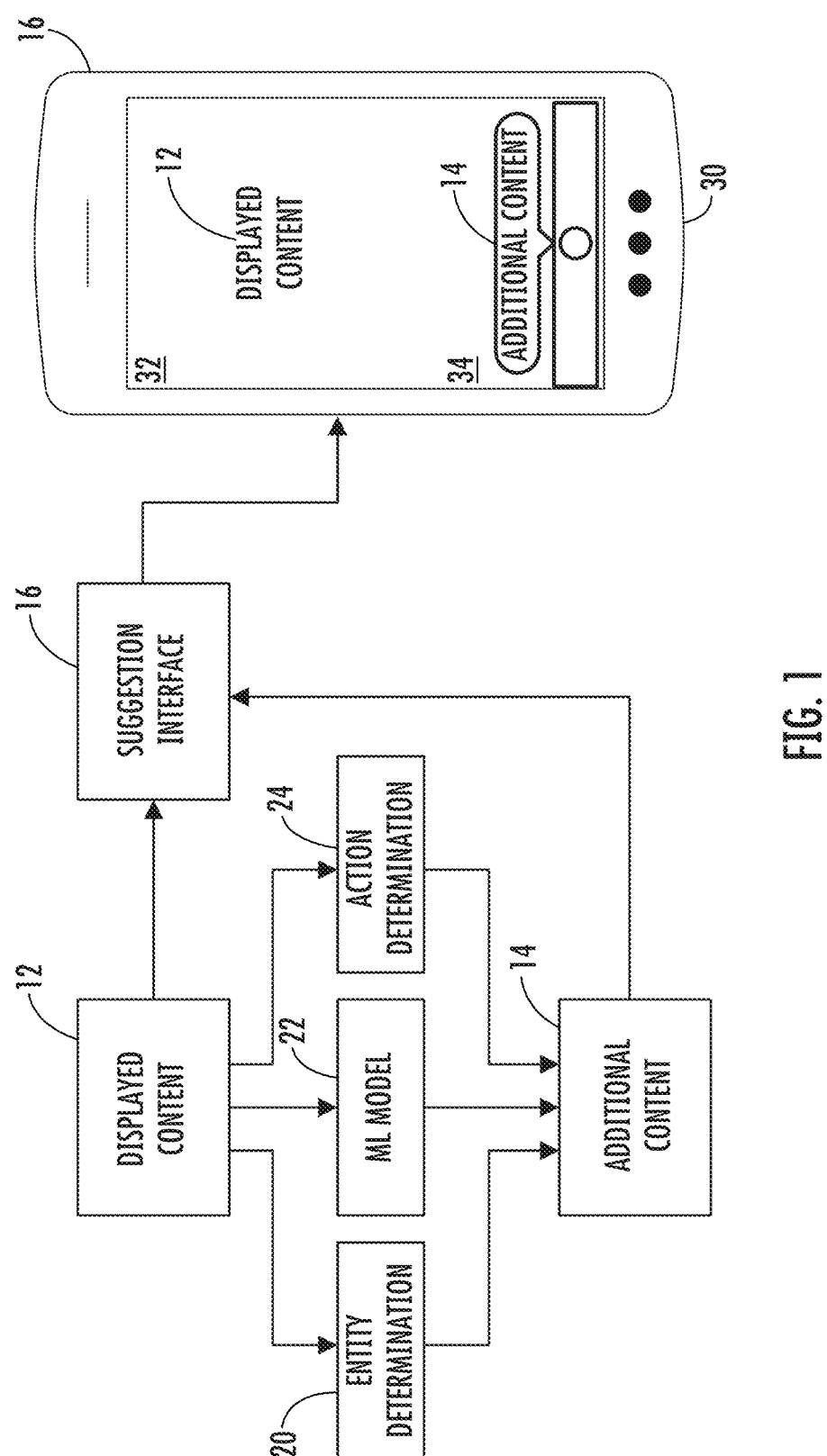
FIG. 1 depicts a block diagram of an example additional content suggestion system according to example embodiments of the present disclosure.

Reference numerals that are repeated across plural figures are intended to identify the same features in various implementations.

DETAILED DESCRIPTION

Generally, the present disclosure is directed to systems and methods for providing an interface for accessing additional content associated with a displayed content item. In particular, systems and methods disclosed herein can leverage additional content prediction to provide information associated with the displayed content, which can provide supplemental information for a more comprehensive understanding of a topic and/or provide a user interface element to perform an action associated with the displayed content. The systems and methods can utilize one or more search engines, one or more databases, one or more machine-learned models, and/or one or more user interface elements. The systems and methods disclosed herein provide suggestions that can proactively determine other information and/or other actions that may be useful to a user. For example, the systems and methods can include obtaining content data. The content data can include an indication of displayed content provided for display to a user. The systems and methods can include determining additional content associated with the displayed content. The additional content can be obtained based on the content data. The systems and methods can include providing an interface for viewing data associated with the displayed content and the additional content.

The systems and methods can include obtaining content data. The content data can include an indication of a displayed content provided for display to a user. In some implementations, the displayed content can be associated with the web page. The content data can include a uniform resource locator. The displayed content can include a web page, a video, a book, and/or a mobile application. The content data can include a uniform resource locator, text data, image data, latent encoding data, and/or other metadata associated with the displayed content. The displayed content can include a web page, a document, and/or other information provided for display on a computing device. Obtaining the content data can include obtaining the text data, image data, structure data, and/or latent encoding data currently being provided in a viewer and generating content data descriptive of the obtained data. Alternatively and/or additionally, obtaining the content data can include processing the source code, obtaining database data associated with a uniform resource locator, and/or processing a full web page to generate one or more embeddings.

The systems and methods can include determining additional content associated with the displayed content. The additional content can be obtained based on the content data. In some implementations, the additional content can include a purchase link. The purchase link can be associated with a product associated with the displayed content. The additional content can include an augmented reality experience. The additional content can be obtained from one or more databases and/or may be generated based on the displayed content and/or one or more other resources. The additional content determination can be performed automatically in the background without prompting by a user. Alternatively and/or additionally, a user may select one or more user interface elements to request the additional content determination. In some implementations, the additional content determination can occur during the display of the displayed content.

In some implementations, determining the additional content associated with the displayed content can include determining a uniform resource locator associated with the displayed content and determining an additional web page associated with the uniform resource locator. Additionally and/or alternatively, additional content can be generated based on the additional web page. The additional web page can include a web page that cites the displayed content and/or a web page associated with the uniform resource locator by a search engine and/or a knowledge graph. The additional web page may provide similar and/or contradictory information.

In some implementations, determining the additional content associated with the displayed content can include determining a plurality of additional resources associated with the displayed content, determining a plurality of predicted actions associated with one or more resources of the plurality of additional resources, and generating a plurality of action interface elements. The plurality of action interface elements can be associated with the plurality of predicted actions. The plurality of action interface elements can be provided for display in the interface.

Alternatively and/or additionally, determining the additional content associated with the displayed content can include processing at least a portion of the displayed content with a machine learned model to determine a machine-learned output and determining the additional content based on the machine-learned output.

The systems and methods can include providing an interface for viewing data associated with the displayed content and the additional content. The interface can include a web page viewer and a preview bubble. In some implementations, the web page viewer can provide a portion of the displayed content for display. The preview bubble can provide a snippet associated with the additional content. In some implementations, the interface can include a swipe-up interface element configured to display a portion of the additional content based on a user input. The interface can include a type indicator associated with a content type of the additional content. For example, the type indicator can be descriptive of action type, and the additional content can be associated with performing a particular action. Alternatively and/or additionally, the type indicator can be descriptive of an understanding type. The additional content can provide supplementary information for understanding a particular topic associated with the displayed content. The interface can include a selectable user interface element for providing an augmented reality experience associated with a topic of the displayed content.

In some implementations, the interface can include a scroll indicator and a bubble interface element. The scroll indicator can indicate a position of a currently viewed portion of the displayed content with respect to other portions of the displayed content. Additionally and/or alternatively, the bubble interface element can be provided in the interface adjacent to the scroll indicator. The bubble interface element can move in the display as the scroll indicator moves. The bubble interface element may provide data associated with a determined additional content for display. In some implementations, the data provided for display in the bubble interface element can change as different additional content is determined. For example, a beginning portion of a web page may discuss a first topic, and an additional web page discussing the first topic in detail can be determined and provided as suggested additional content. The user may scroll to a middle portion of the web page that discusses a second topic, and a second additional web page discussing the second topic in detail can be determined and provided as suggested additional content. The user may then scroll to a bottom portion of the web page that provides an object for sale at a set price. The bubble interface element can then provide an option to track the price and/or suggest a different web resource that has the object for sale at a lower cost.

In some implementations, providing the interface for viewing data associated with the displayed content and the additional content can include providing at least a portion of the displayed content for display with a suggestion interface element, obtaining a selection of the suggestion interface element, and providing at least a portion of the additional content for display.

Additionally and/or alternatively, the systems and methods can include providing a suggestion interface element for display in a first state. The suggestion interface element can be descriptive of whether additional content has been determined. In response to determining the additional content associated with the displayed content, the systems and methods can provide the suggestion interface element for display in a second state. The second state can be descriptive of the additional content being determined.

In some implementations, the systems and methods can include obtaining input data. The input data can be descriptive of a selection of a suggestion interface element of the interface. The systems and methods can include providing a portion of the additional content for display based on the input data.

Alternatively and/or additionally, the systems and methods can include processing (e.g., with one or more machine-learned models) a portion of the displayed content to generate semantic data. The semantic data can be descriptive of a semantic understanding of the portion of the displayed content. The systems and methods can include querying a database based at least in part on the semantic data. In some implementations, the additional content can be determined based on the querying of the database.

The internet can provide a plethora of resources on a variety of topics. A user may be viewing and/or reading information provided on a topic. Additional information on the topic may be relevant to a user. The relevant information may be unknown to the user and/or may be desired by the user; however, the user may not obtain the information until later due to additional search hurdle. The systems and methods disclosed herein can automatically process displayed content to determine the relevant additional content that can be suggested to the user.

Additionally and/or alternatively, the information may be out-of-date and/or may not be the most reliable information. The systems and methods disclosed herein can determine an entity (e.g., a topic, an author, a publisher, and/or a field of knowledge associated with a topic of the displayed content) associated with a displayed content item and can determine more recent and/or more reliable information on the particular entity to be suggested to the user.

Alternatively and/or additionally, a user may want to better understand the information and/or interact with the information; however, the user may traditionally be limited to manually performing additional searches and/or bookmarking the web page. The systems and methods disclosed herein can leverage one or more machine-learned models to suggest a summary of the displayed content. In some implementations, the systems and methods can determine an action associated with the content type of the displayed content, and the action can be suggested to the user. For example, the displayed content can include an advertisement for a product or service. The systems and methods can determine the advertisement content type and can suggest a price tracking feature that can recursively update the user on future price changes. In some implementations, the displayed content can include an event (e.g., a football game), and an event content type can be determined. The systems and methods may suggest tracking the event updates (e.g., score updates). The action can include a summarization action, a tracking action, a save action, and/or a related resource look-up action (e.g., in response to determining a movie review content type, the systems and methods may suggest a movie theater web page for booking tickets and/or may suggest a web resource that includes actor and director information for the movie).

Articles and other content items can be lengthy and/or may discuss tangential topics merely in passing. The length and/or the lack of full context can cause additional hurdles for readers that may traditionally lead to further searches and can be time consuming. The systems and methods disclosed herein can proactively determine and suggest a summary for the content. Additionally and/or alternatively, the systems and methods can proactively determine a relevant tangential topic in the displayed content. The systems and methods can determine additional content associated with the tangential topic and can suggest the additional content to the user.

In response to the information provided in a displayed content item, a user may desire additional information and/or attempt to perform one or more additional actions based on the information provided in the displayed content item. Obtaining the additional information and/or performing the additional actions can include searching for supplementary information, searching for a purchase portal for purchasing a product discussed in the displayed content item, and/or one or more other additional actions. The additional actions can be time consuming, and a user may be uncertain on how to perform such additional actions, which can cause further confusion. The systems and methods disclosed herein can automatically determine additional information and/or additional actions associated with the displayed content and can suggest the additional information and/or additional actions to the user.

The systems and methods of the present disclosure provide a number of technical effects and benefits. As one example, the system and methods can provide an interface for providing additional content prediction. The additional content prediction can enable a user to perform one or more actions and/or obtain additional information on a topic. The additional content prediction may be provided in an interface that allows a user to view a portion of the additional content while still displaying a portion of an initial content item.

Another technical benefit of the systems and methods of the present disclosure is the ability to leverage one or more machine-learned models to determine a particular portion of the displayed content is descriptive of a specific topic to determine a plurality of different additional content items to provide in which each respective additional content item may be associated with a respective portion of the displayed content item.

Another example of technical effect and benefit relates to improved computational efficiency and improvements in the functioning of a computing system. For example, the systems and methods disclosed herein can leverage the additional content prediction to proactively provide resources which may be desired by a user, which can save time and computational power over navigating to one or more additional web pages to find the resource associated with the additional content.

With reference now to the Figures, example embodiments of the present disclosure will be discussed in further detail.

FIG. 1 depicts a block diagram of an example additional content suggestion system 10 according to example embodiments of the present disclosure. The additional content suggestion system 10 can include obtaining content data associated with displayed content 12, determining additional content 14 associated with the displayed content 12, and providing a suggestion interface 16 for display.

In particular, the displayed content 12 can include at least a portion of a web page and/or a portion of a document displayed in a user interface. The content data can include data descriptive of the displayed content 12. The content data can include a uniform resource locator, a text embedding, an image embedding, a portion of a source code, text data, latent encoding data, and/or image data.

The content data can be processed to determine an entity 20 associated with the displayed content 12. The determined entity 20 can then be utilized to determine the additional content 14. For example, the determined entity 20 can be utilized to generate a search query, which can be utilized to query a search engine and/or a database to determine additional content associated with the determined entity 20.

Alternatively and/or additionally, the content data can be processed with one or more machine-learned models 22 to generate a machine-learned model output. The machine-learned model output can be the additional content 14 and/or can be utilized to determine additional content 14. For example, the machine-learned model 22 can be trained to summarize content, and the additional content 14 can be a summary of the displayed content 12. Alternatively and/or additionally, the machine-learned model 22 can be a semantic understanding model (e.g., a natural language processing model trained for semantic understanding) that can processed the displayed content 12 to generate a semantic understanding output. The semantic understanding output can then be utilized to determine other web resources and/or other documents that are associated with the semantic understanding.

In some implementations, the displayed content 24 can be processed to determine one or more actions 24 associated with the displayed content 12. User interface elements for performing the one or more actions 24 can be provided as additional content 14. For example, the displayed content 12 can be determined to include content that can potentially change overtime, and a tracking action can be provided as an option to a user. Alternatively and/or additionally, the displayed content 12 can be determined to include an object that is associated with an augmented-reality experience (e.g., a live try-on experience), and an augmented-reality experience can be provided as an option.

The displayed content 12 and the suggested additional content 14 can be provided for display in a suggestion interface 16. The suggestion interface 16 can be provided for display on a mobile device 30, a desktop device, a smart wearable, and/or via other display devices. The suggestion interface 16 can include a viewing window 32 for the displayed content 12 and a pop-up interface element 34 for the additional content 14. Alternatively and/or additionally, the additional content 14 can be provided for display in a dynamically moving bubble interface element that moves in unison with a scroll indicator.

Figure 2A:
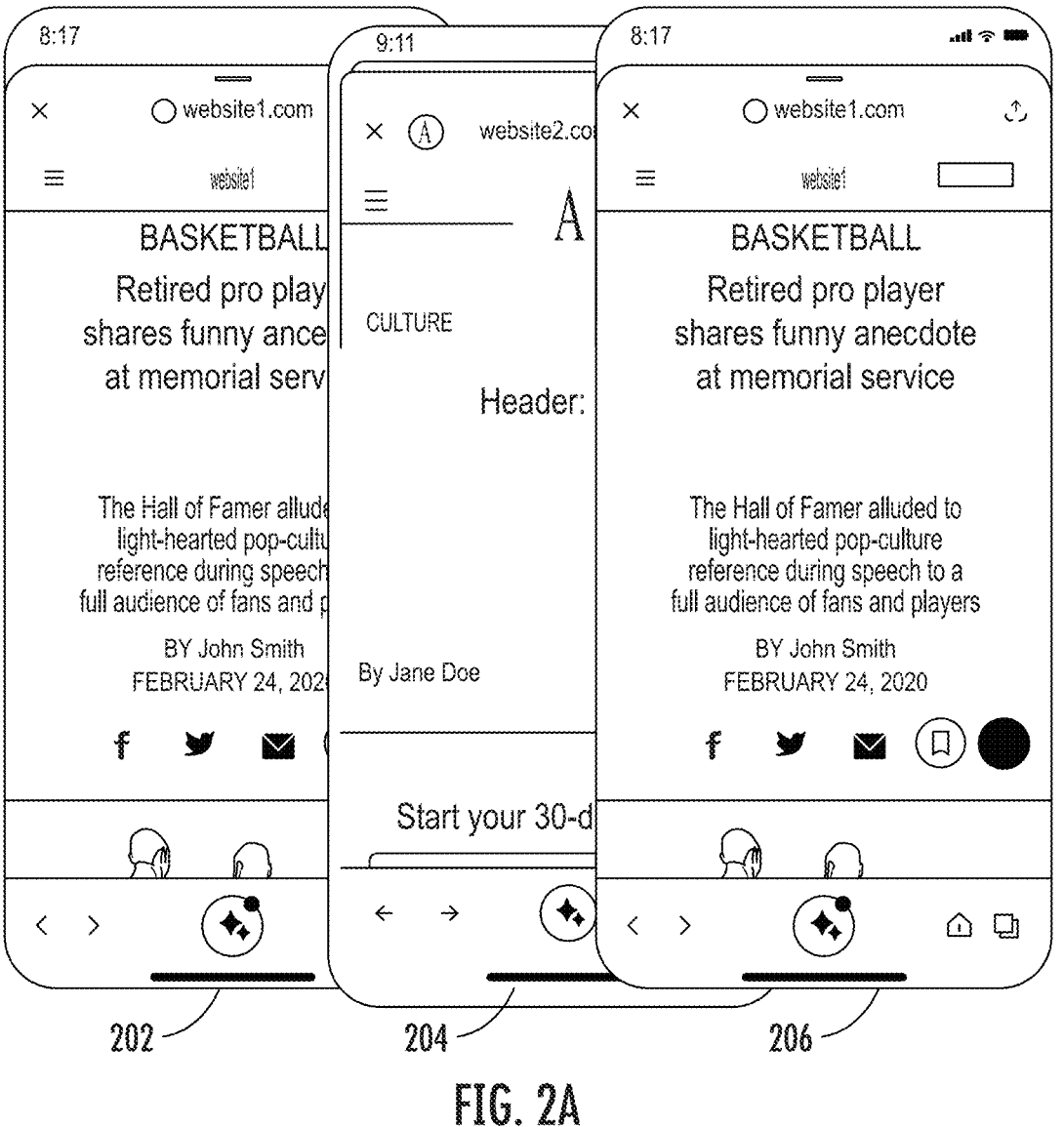

FIGS. 2A-2B depict illustrations of an example interface according to example embodiments of the present disclosure. In particular, FIG. 2A depicts a suggestion interface element in three different states. The first state 202 can include the suggestion interface element provided without color and/or without a badge, which can be descriptive of additional content not yet being determined. The second state 204 can include the suggestion interface element with a differing color than the first state 202, which can be descriptive of additional content having been determined. The third state 206 can include the suggestion interface element of the second state 206 with the addition of a badge, which can indicate the determined additional content is provided with a high confidence level of correlation with the displayed content.

FIG. 2B can depict additional content data being provided in the interface. At 208, a preview bubble is provided in the interface. The preview bubble can include a snippet associated with the determined additional content. The snippet can be descriptive of information provided by the additional content. The preview bubble may be provided in response to a selection of the suggestion interface element and/or may be provided automatically.

At 210, an expanded panel can be provided for display, which can include more information on the additional content and/or auxiliary content associated with the displayed content. The interface depicted in 210 may be provided in response to a selection of the suggestion interface element and/or the preview bubble. The auxiliary content can include additional resources associated with entities discussed in the displayed content.

Figure 3:
FIG. 3 depicts illustrations of example suggestion interface elements according to example embodiments of the present disclosure.

FIG. 3 depicts illustrations of example suggestion interface elements according to example embodiments of the present disclosure. In some implementations, the suggestion interface element can differ based on the determined information provided by the displayed content. For example, the suggestion interface element can include selectable action elements for performing one or more actions. At 302, a track price action element and a fast checkout element is provided for display in response to determining the displayed content is associated with a product for sale. The track price action can be utilized to set-up an application programming interface that can provide notifications to a user as the price of the product changes. The fast checkout action element can be utilized to interface with a web platform to purchase the product for sale using stored user data. At 304, a music action element can be provided in response to determining the displayed content discusses a musical artist and/or an album. The music action element can be utilized to play a song and/or a playlist associated with the information provided by the displayed content.

Figure 4:
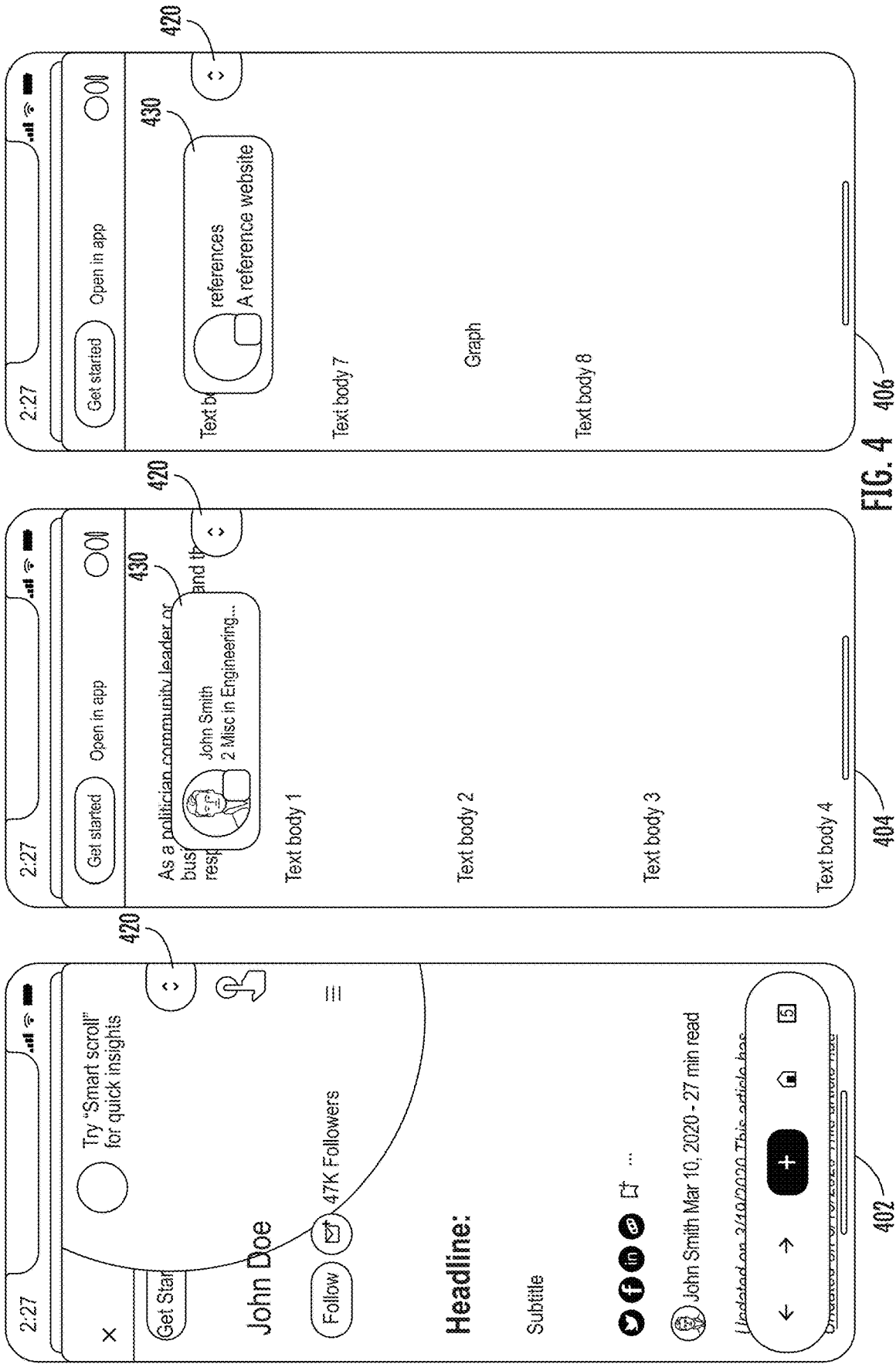
FIG. 4 depicts illustrations of example scroll interfaces according to example embodiments of the present disclosure.

FIG. 4 depicts illustrations of example scroll interfaces according to example embodiments of the present disclosure. In some implementations, the interface for providing additional content can include a scroll interface. The scroll interface can include a scroll indicator 420 that can indicate a position of the currently viewed portion of the displayed content relative to the displayed content as a whole. The scroll interface can additionally include a bubble interface element 430 that can be provided adjacent to the scroll indicator 420. The bubble interface element 430 may move in unison with the scroll indicator 420 as a user navigates through the displayed content. Additionally and/or alternatively, the snippet provided in the bubble interface element 430 can be descriptive of additional content that may be viewed. The snippet can change as the user navigates through the displayed content. Additionally and/or alternatively, the additional content may vary based on the particular portion of the displayed content currently being displayed. In some implementations, the scroll interface can be indicated based on a tutorial interface element (e.g., as shown in 402). The additional content can then be determined based on the data provided in the view window, and a bubble interface element 430 can be provided for display (e.g., as shown in 404). As the user scrolls further down the page (e.g., the displayed content), a new additional content item can be determined, and the snippet in the bubble interface element 430 can change (e.g., as shown in 406).

Figure 5A:
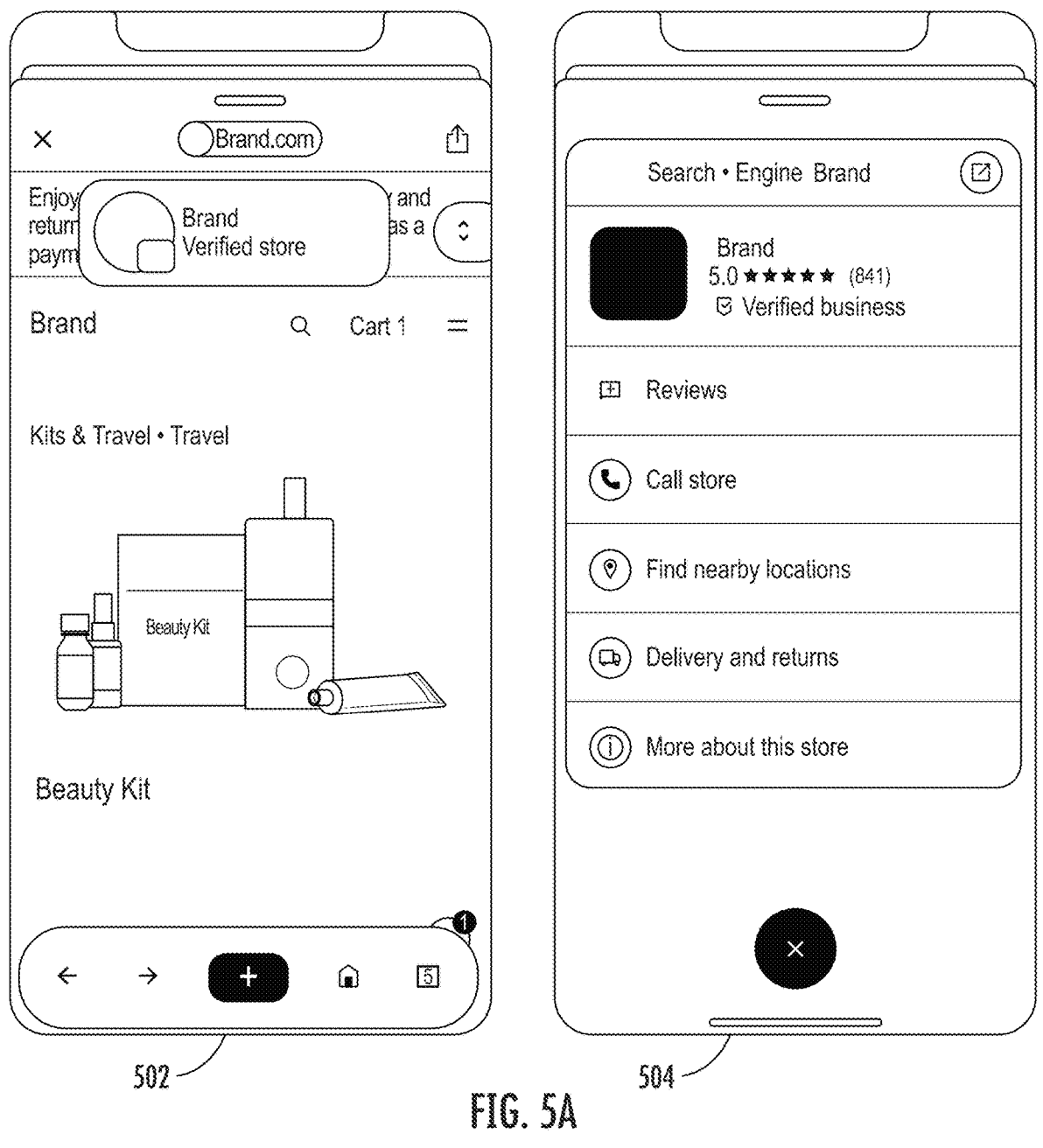
FIGS. 5A-5C depict illustrations of an example interface according to example embodiments of the present disclosure.
Figure 5B:
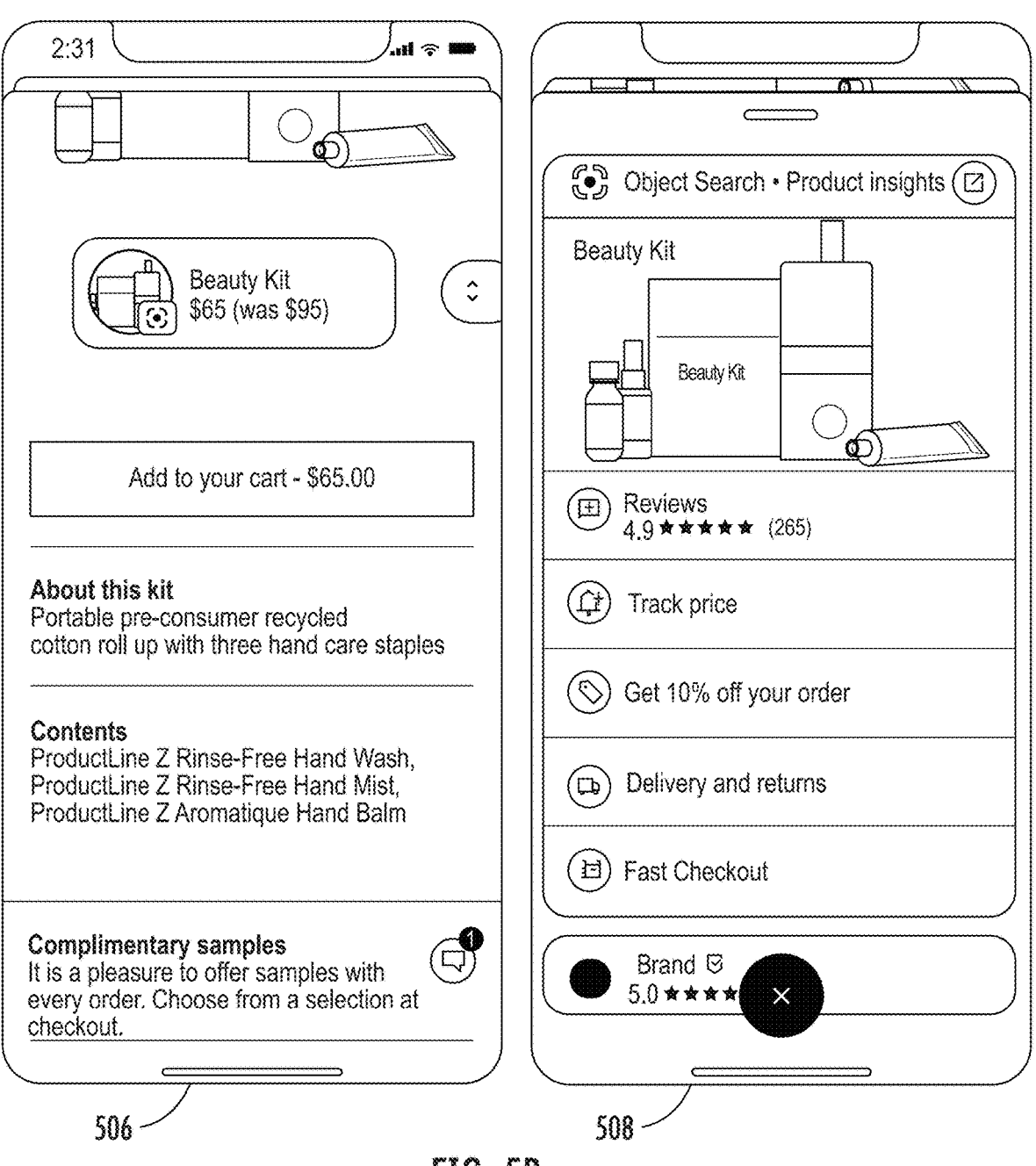
Figure 5C:

FIGS. 5A-5C depict illustrations of an example interface according to example embodiments of the present disclosure. In particular, the interface of FIGS. 5A-5C includes a scroll interface that dynamically changes the snippet of the bubble interface element as the suggested additional content item changes. The dynamic change can be based on the change in information provided as a user navigates through the displayed content. For example, in FIG. 5A, entity specific information can be obtained to generate a first additional content item. The entity can be determined based on the information obtained in a first viewed portion 502 of the displayed content item. The bubble interface element can then be selected to open a first additional window 504 that displays the first additional content item which can include a link to a mobile application, entity contact information, and a link to learn more about the entity.

In FIG. 5B, a second viewed portion 506 of the displayed content item can be displayed with an updated bubble interface element. The bubble interface element can be interacted with in order to open a second additional window 508, which can include a second additional content item generated based on the second viewed portion discussing a particular product. The second additional content item may include a link to open an augmented-reality live try-on experience for viewing the product in a user's environment.

In FIG. 5C, a third viewed portion 510 of the displayed content item can be displayed with an updated bubble interface element. The bubble interface element can be interacted with in order to open a third additional window 512, which can include a third additional content item generated based on the third viewed portion discussing a routine or process. The third additional content item may include one or more resources explaining how to perform the routine or process, which can include videos and/or step-by-step lists.

Figure 6:
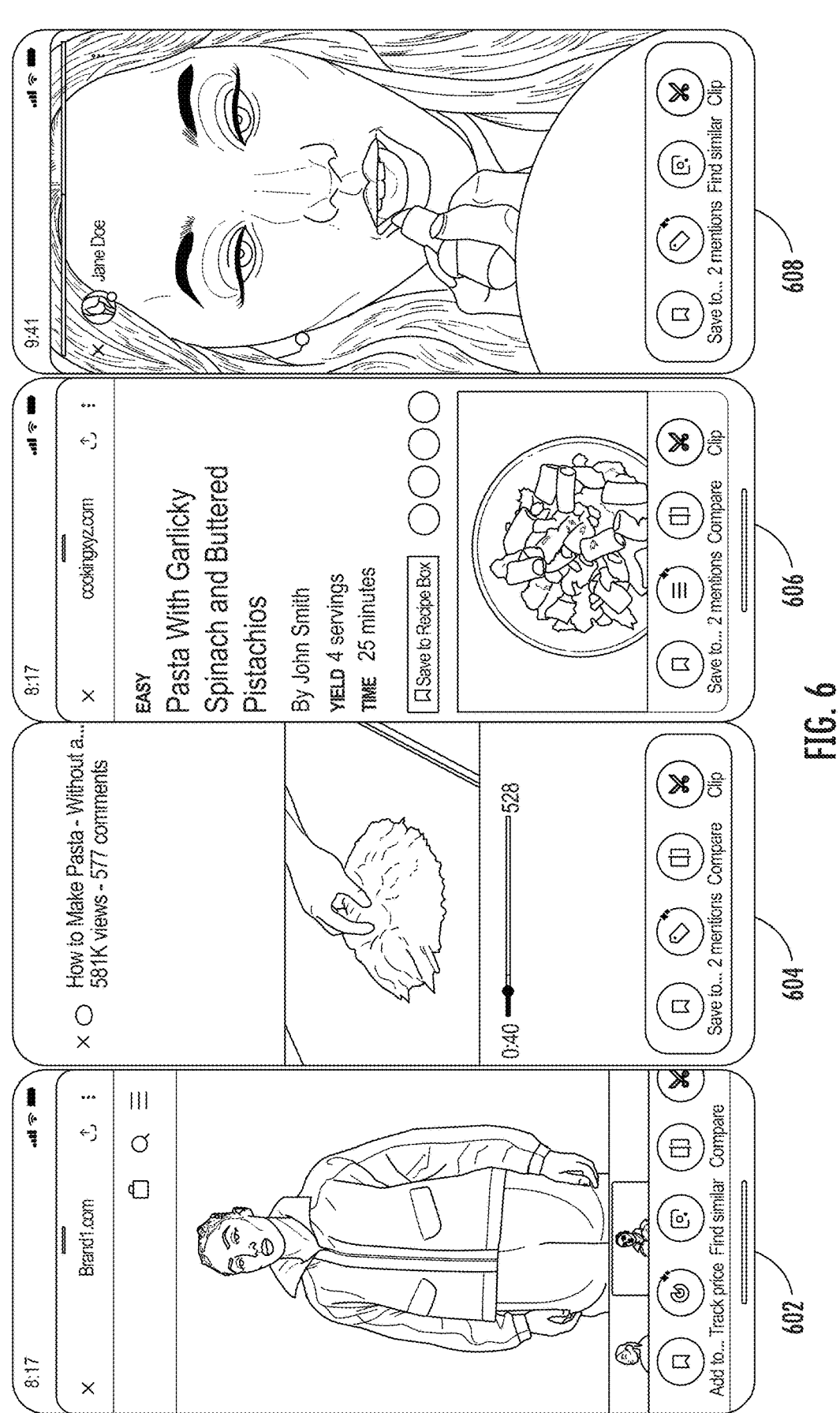
FIG. 6 depicts illustrations of example tray of actions interfaces according to example embodiments of the present disclosure.

FIG. 6 depicts illustrations of example tray of actions interfaces according to example embodiments of the present disclosure. In some implementations, the interface for presenting additional content can include a tray of actions interface. The tray of actions interface can include one or more predicted actions determined based on the displayed content and/or one or more predetermined actions, which can be provided regardless of the information provided by the displayed content. For example, the first tray of actions interface 602, the second tray of actions interface 604, the third tray of actions interface 606, and the fourth tray of actions interface 608 can all include a bookmark action element to enable a user to bookmark and/or save the displayed content; however, the other action elements in the tray of actions interface may vary based on the particular displayed content. In particular, the first tray of actions interface 602 includes a track price action element, a find similar action element, and a compare action element in response to determining the displayed content is associated with a product for purchase. Additionally and/or alternatively, the second tray of actions interface includes a mentions action element (e.g., to view other resources that mentioned the particular displayed content), a compare action element, and a clip action element (e.g., to save a portion of the particular displayed content) in response to determining the displayed content is associated with a media content item (e.g., a video). The third tray of actions interface 606 includes an ingredients action element (e.g., to add a recipe to a cookbook and/or to obtain and save the ingredients list), a compare action element, and a clip action element in response to determining the displayed content is associated with a recipe. The fourth tray of actions interface 608 includes a mentions action element, a find similar action element, and a clip action element in response to determining the displayed content is associated with a product advertisement.

Figure 7:
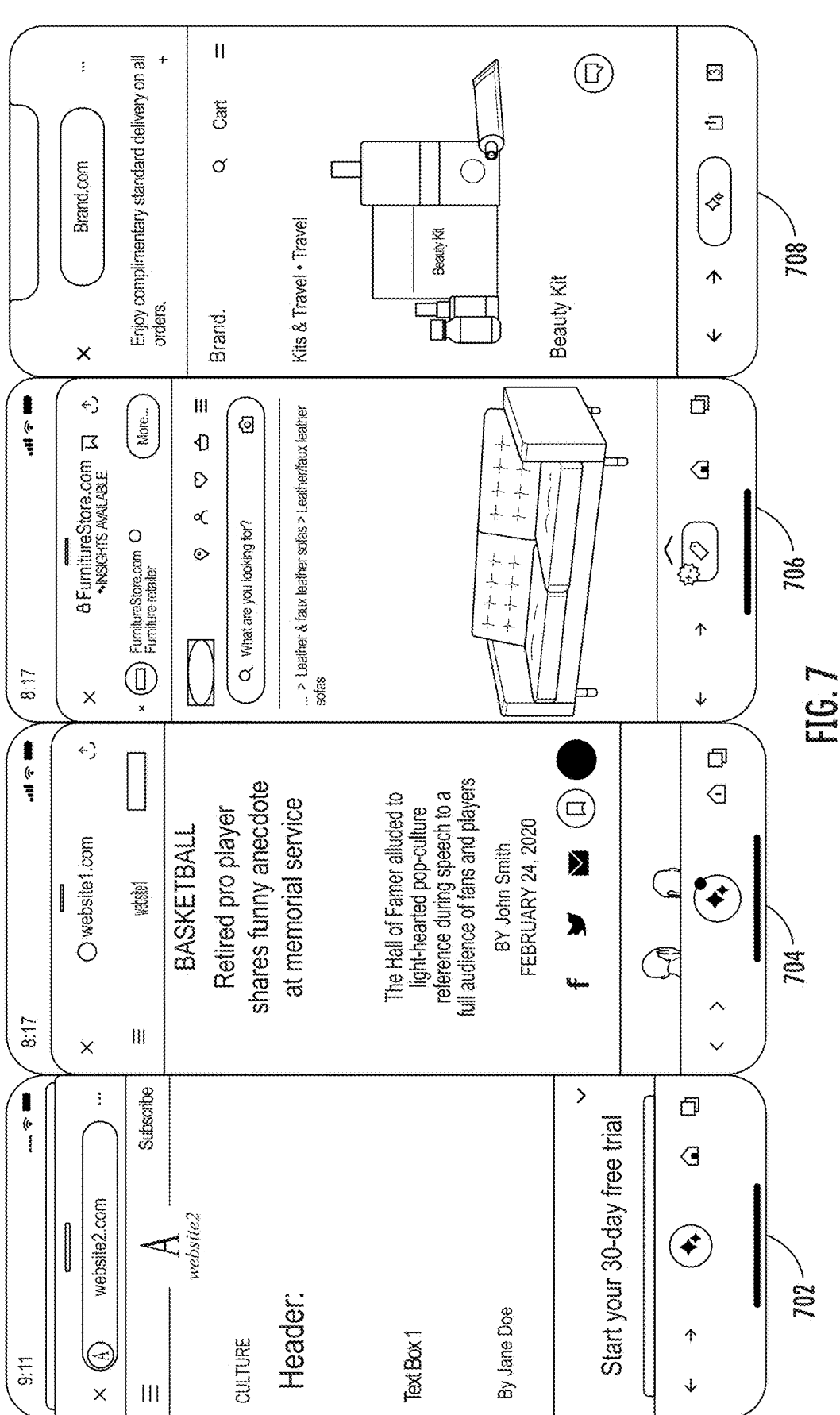
FIG. 7 depicts illustrations of example entry point elements according to example embodiments of the present disclosure.

FIG. 7 depicts illustrations of example entry point elements according to example embodiments of the present disclosure. The different entry point elements can be utilized uniformly, may differ across platforms, may differ based on the displayed content, and/or may differ based on user preferences. For example, the entry point element in 702 includes a multicolored circular element with a sparkle icon, while the entry point element in 704 dynamically changes, can be extended, can include text, and can include multiple icons. The entry point element in 706 includes a modified entry point element that includes an icon associated with a determined action associated with the determined additional content. Additionally and/or alternatively, the entry point element may differ in color and/or shape when the element is dormant (e.g., when no additional content is currently determined).

Figure 8:
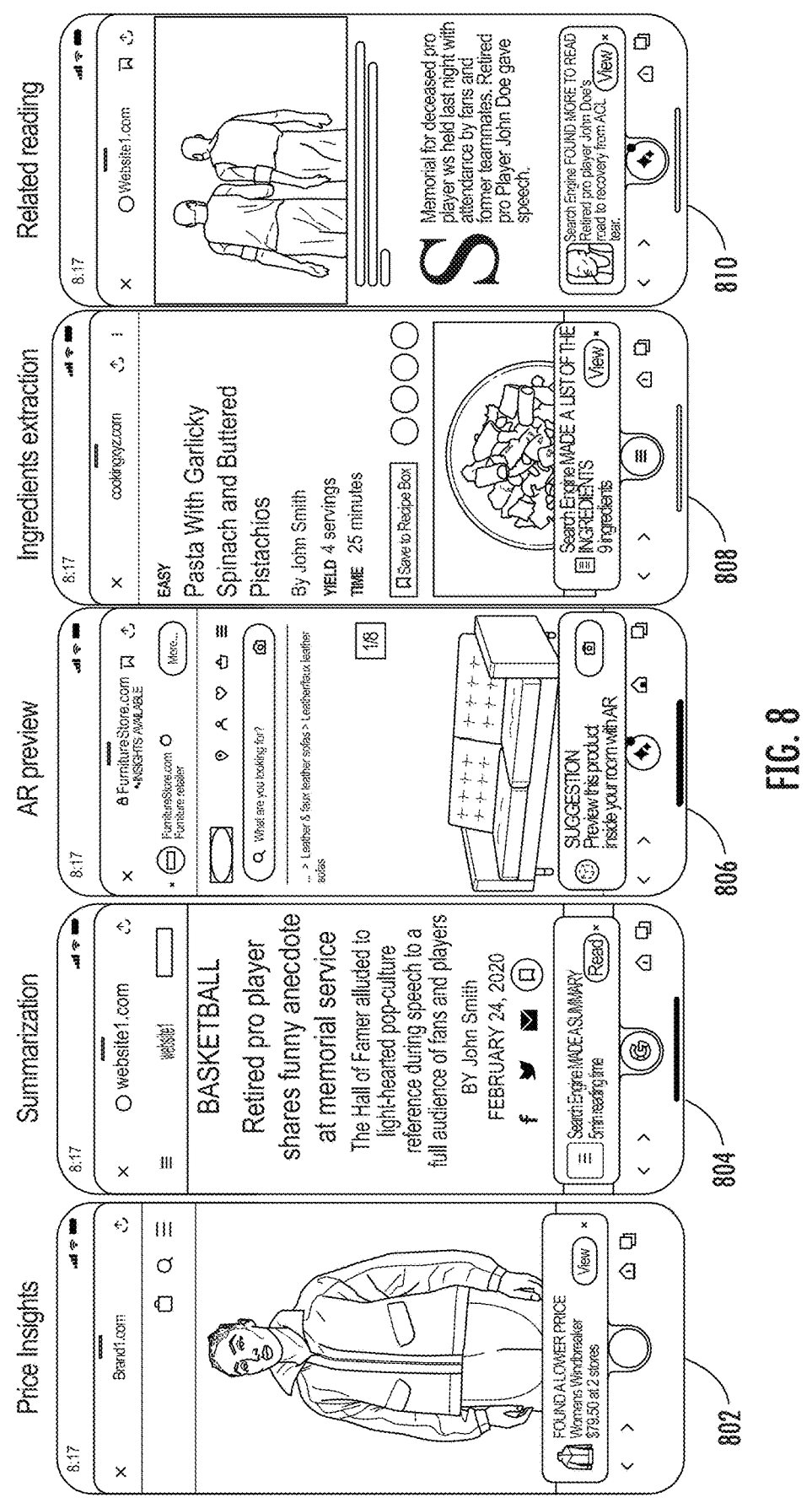
FIG. 8 depicts illustrations of example preview bubbles according to example embodiments of the present disclosure.

FIG. 8 depicts illustrations of example preview bubbles according to example embodiments of the present disclosure. The additional content determined and/or generated based on the displayed data can include price insights 802 (e.g., one or more purchase listings for a product determined to be associated with the displayed content), a summarization 804 (e.g., the displayed content can be processed by a machine-learned model to generate a summary of the displayed content), an augmented-reality preview 806 (e.g., an augmented-reality experience can be obtained and provided to a user based on the displayed content), ingredients extraction 808 (e.g., the ingredients in a recipe can be extracted and saved in a user-specific database), and/or related reading 810 (e.g., supplementary resources associated with a topic in the displayed content can be determined and provided to the user). Each of the different additional content types can be determined and provided based on the displayed content, a context, and/or one or more user preferences. A preview bubble with a snippet can then be provided to a user to provide a preview of the additional content obtained and/or generated. The preview bubble and/or the suggestion interface element may be provided via a plurality of different interface element shapes and sizes.

Figure 9:
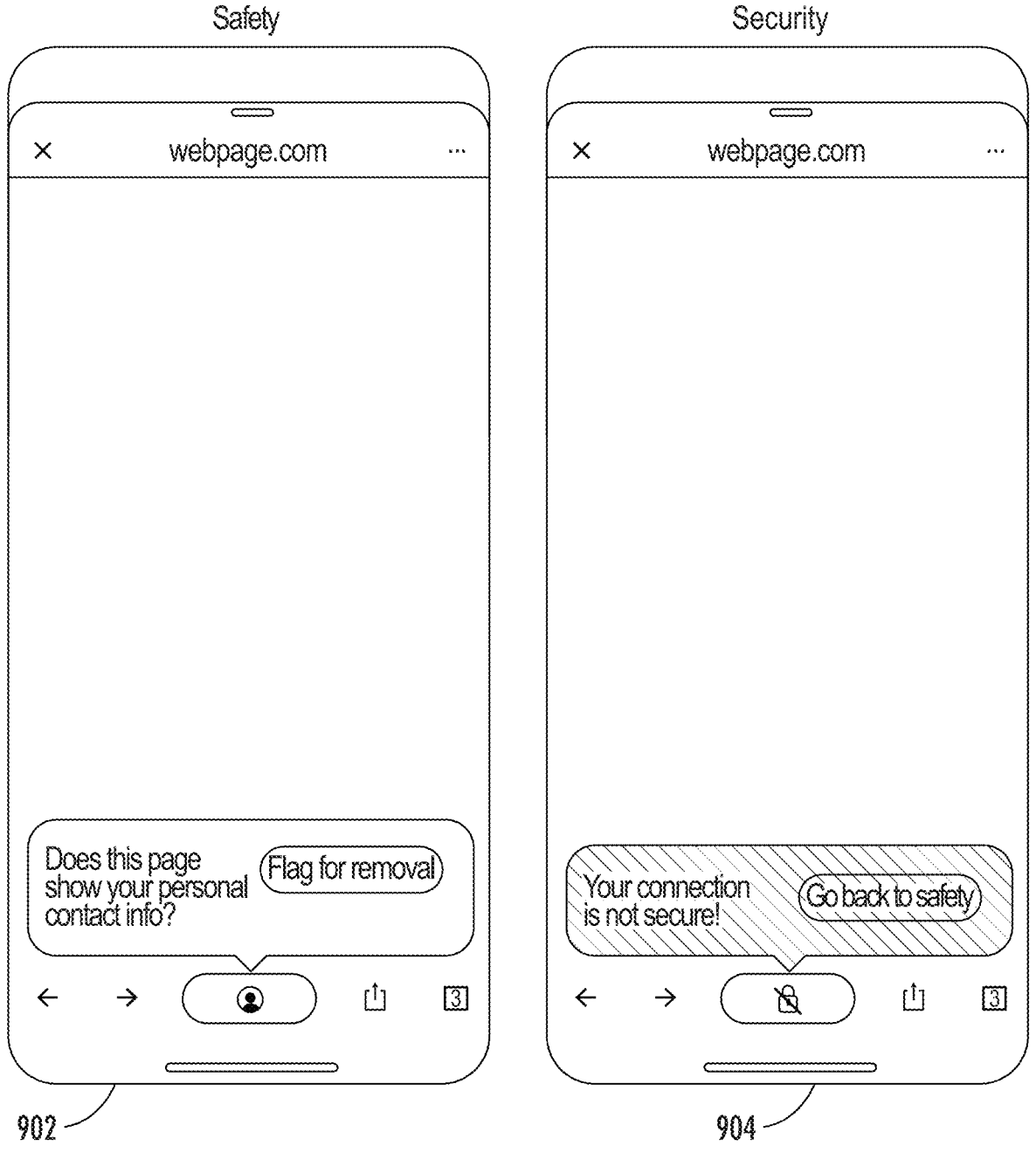
FIG. 9 depicts illustrations of example type indicators according to example embodiments of the present disclosure.

FIG. 9 depicts illustrations of example type indicators according to example embodiments of the present disclosure. In particular, in some implementations, the preview bubble can include a type indicator, which can indicate a type of action associated with the additional content and/or a level of importance associated with the additional content. For example, a proactive action with low to mid security concern may be associated with a first color indicator 902, while a predetermined issue associated with a high security concern may be associated with a second color indicator 904.

Figure 10:
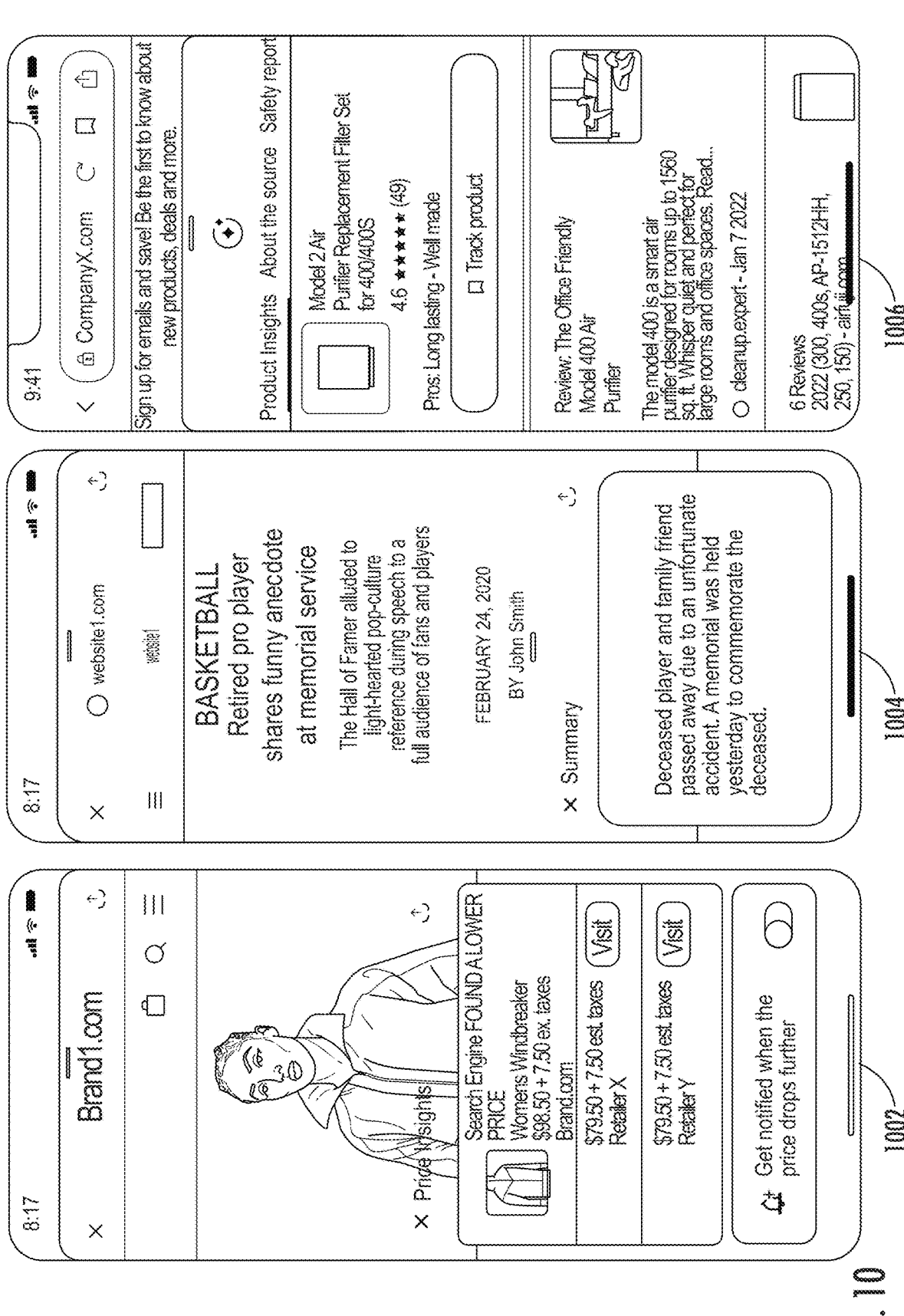
FIG. 10 depicts illustrations of example additional content windows according to example embodiments of the present disclosure.

FIG. 10 depicts illustrations of example additional content windows according to example embodiments of the present disclosure. The additional content window can be provided for display in response to an interaction with the suggestion interface element and/or the preview bubble. The additional content window may vary based on additional content type. For example, in 1002, multiple price listings from different vendors are provided with a link to visit the web page of the different vendors along with a track price action slider based on the displayed content including a product for sale. In 1004, a textual summary can be provided in a text bubble based on the displayed content including an article. In 1006, a plurality of different tabs and a plurality of different search results can be provided based on the displayed content including a search results page.

Figure 11:
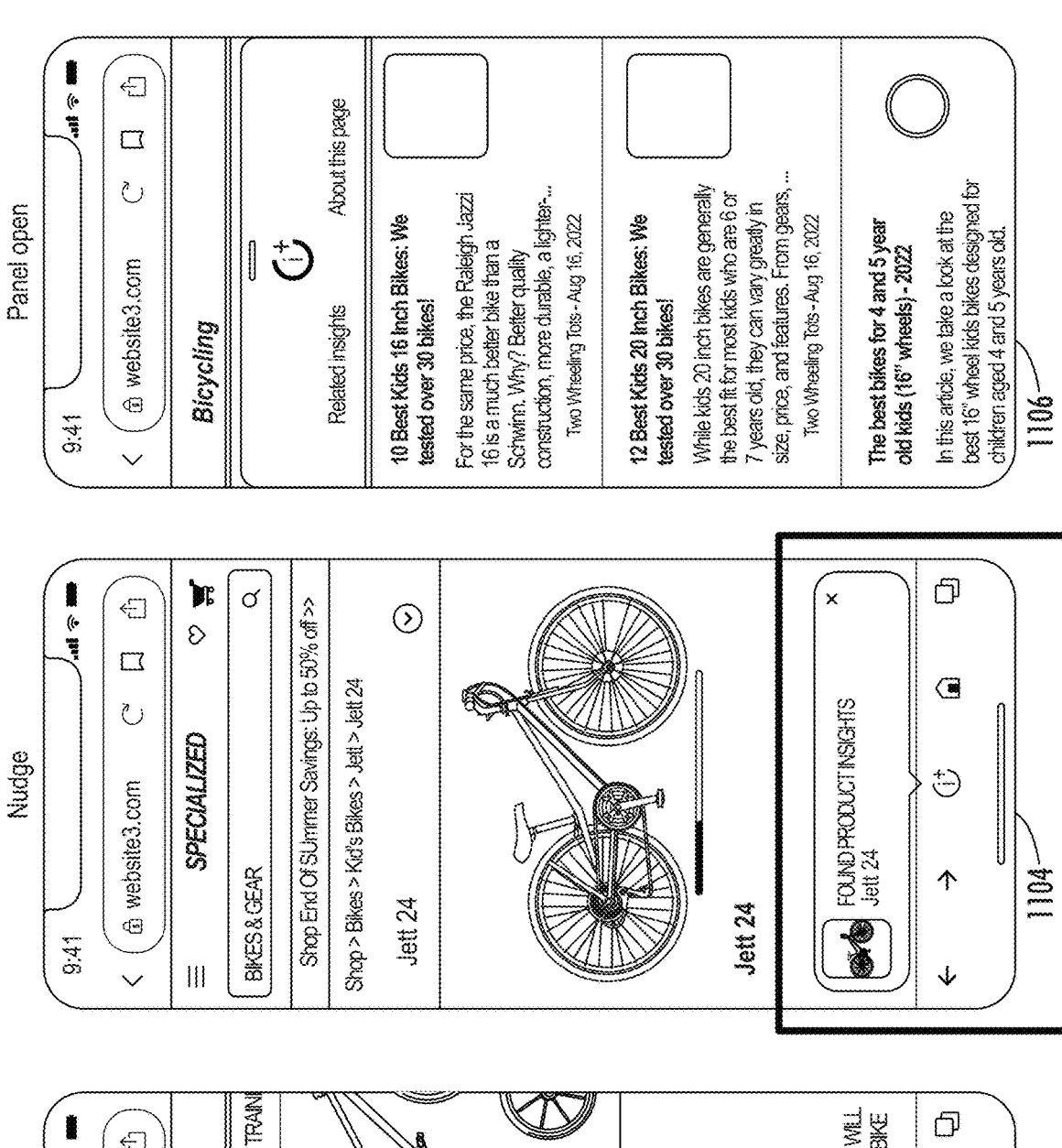
FIG. 11 depicts illustrations of an example interface according to example embodiments of the present disclosure.

FIG. 11 depicts illustrations of an example interface according to example embodiments of the present disclosure. In particular, FIG. 11 depicts the transition of the interface from suggestion interface element display 1102 to preview bubble display 1104 to additional content window display 1106. The suggestion interface element display 1102 can include a displayed content window for displaying a portion of the displayed content and a suggestion interface element that can be interacted with to provide additional content for display. The preview bubble display 1104 can include the displayed content window, the suggestion interface element, and a preview bubble that can include a snippet that provides a preview of the additional content. The additional content window display 1106 can be provided for display in response to one or more obtained inputs and can include an expanded additional content window for viewing one or more additional content items.

Figure 12:
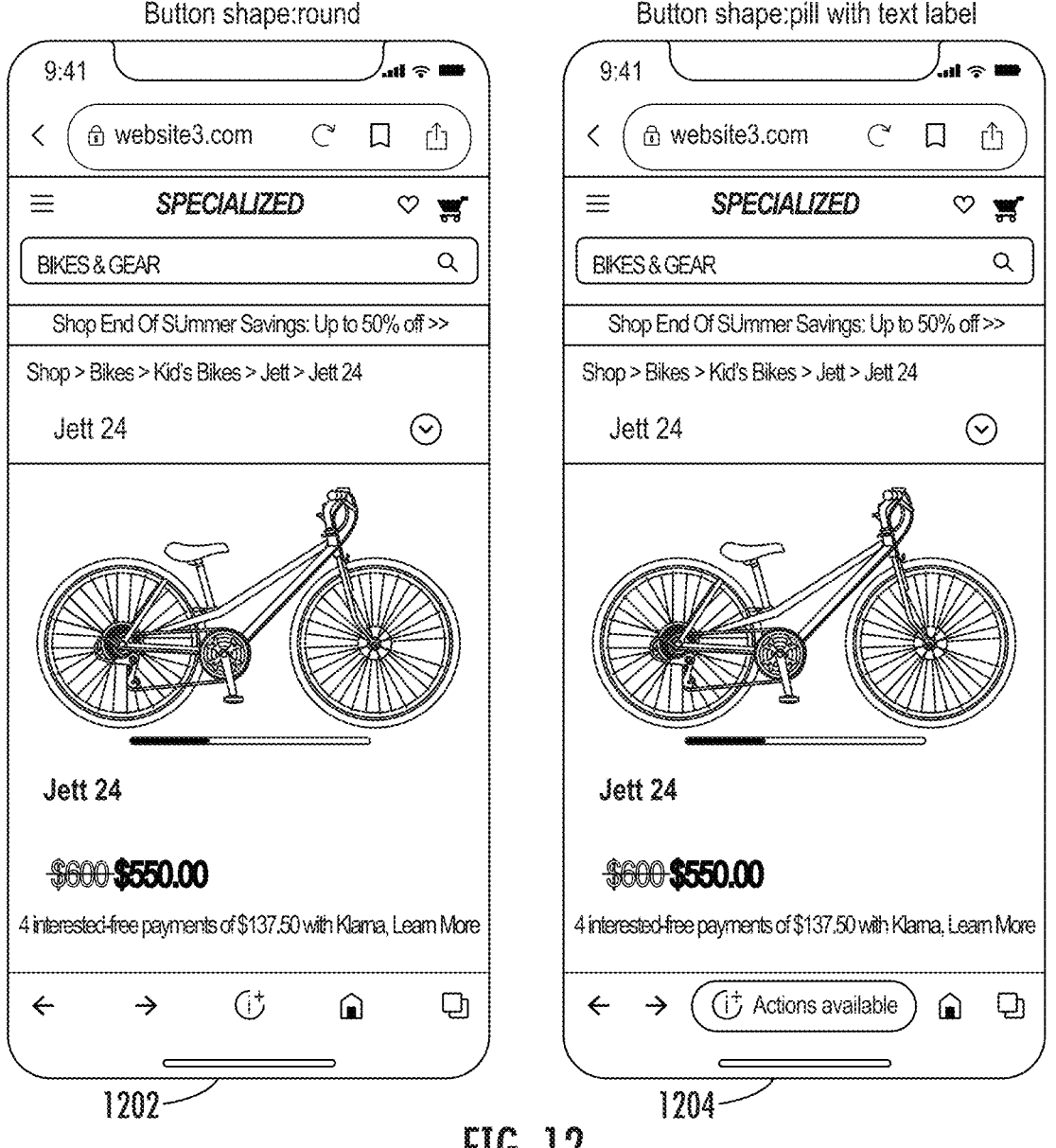
FIG. 12 depicts illustrations of an example suggestion interface element transition according to example embodiments of the present disclosure.

FIG. 12 depicts illustrations of an example suggestion interface element transition according to example embodiments of the present disclosure. In some implementations, the suggestion interface element can expand and collapse. In an initial state 1202, the suggestion interface element can include a round icon. In a secondary state 1204, the suggestion interface element can include an expanded pill with the icon and a text label.

Figure 13:
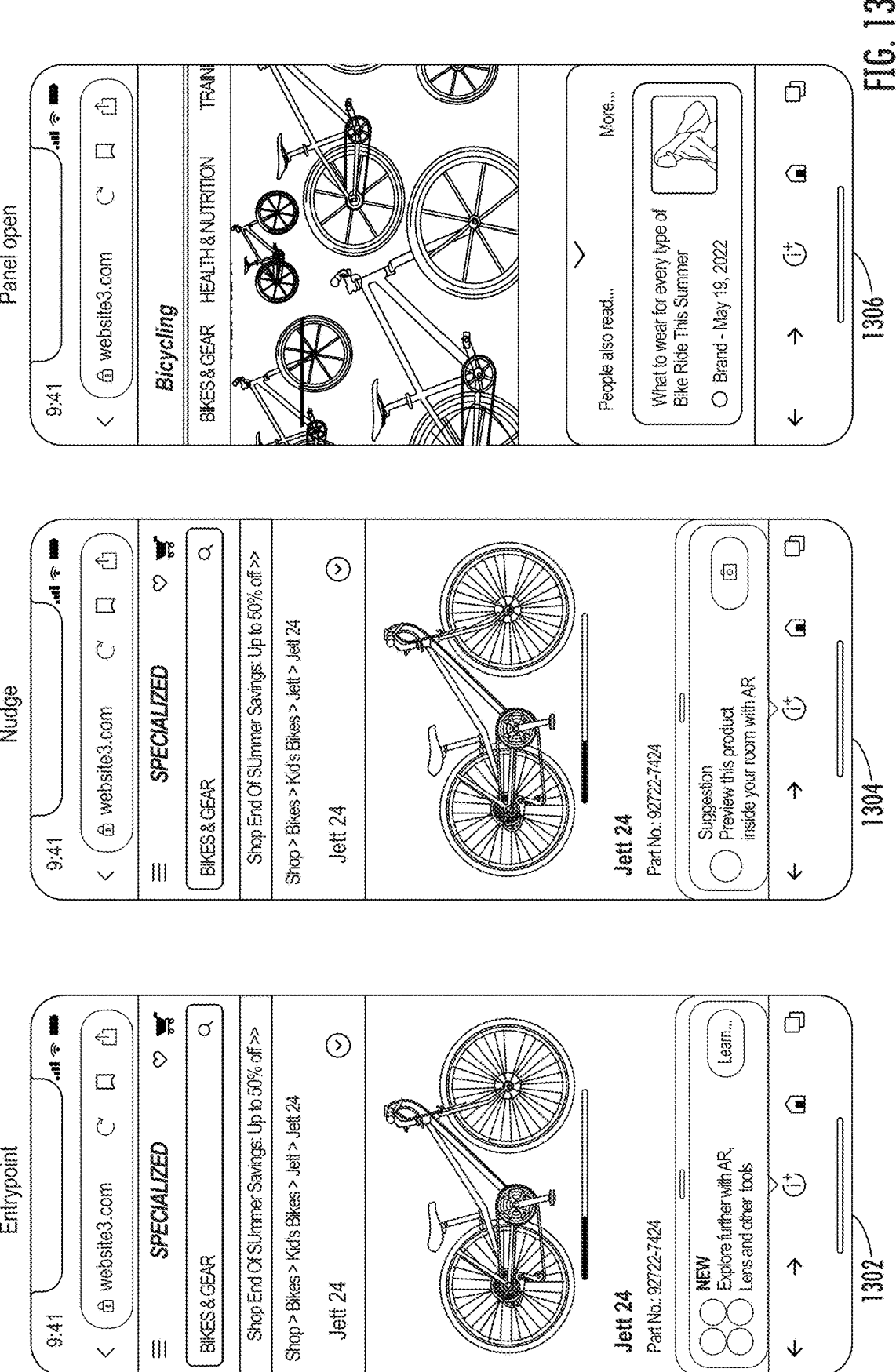
FIG. 13 depicts illustrations of an example interface according to example embodiments of the present disclosure.

FIG. 13 depicts illustrations of an example interface according to example embodiments of the present disclosure. The interface can include an entry point state 1302, a nudge state 1304, and a panel state 1306. The entry point state 1302 can include the displayed content viewing window and a suggestion interface element for selection. The nudge state 1304 can include the displayed content viewing window, a suggestion interface element for selection, and a preview bubble that provides a snippet indicating a possible action to perform. The panel state can include an expanded panel for displaying additional content. The interface may transition from one state to another based on one or more inputs and/or one or more determinations.

Figure 14:
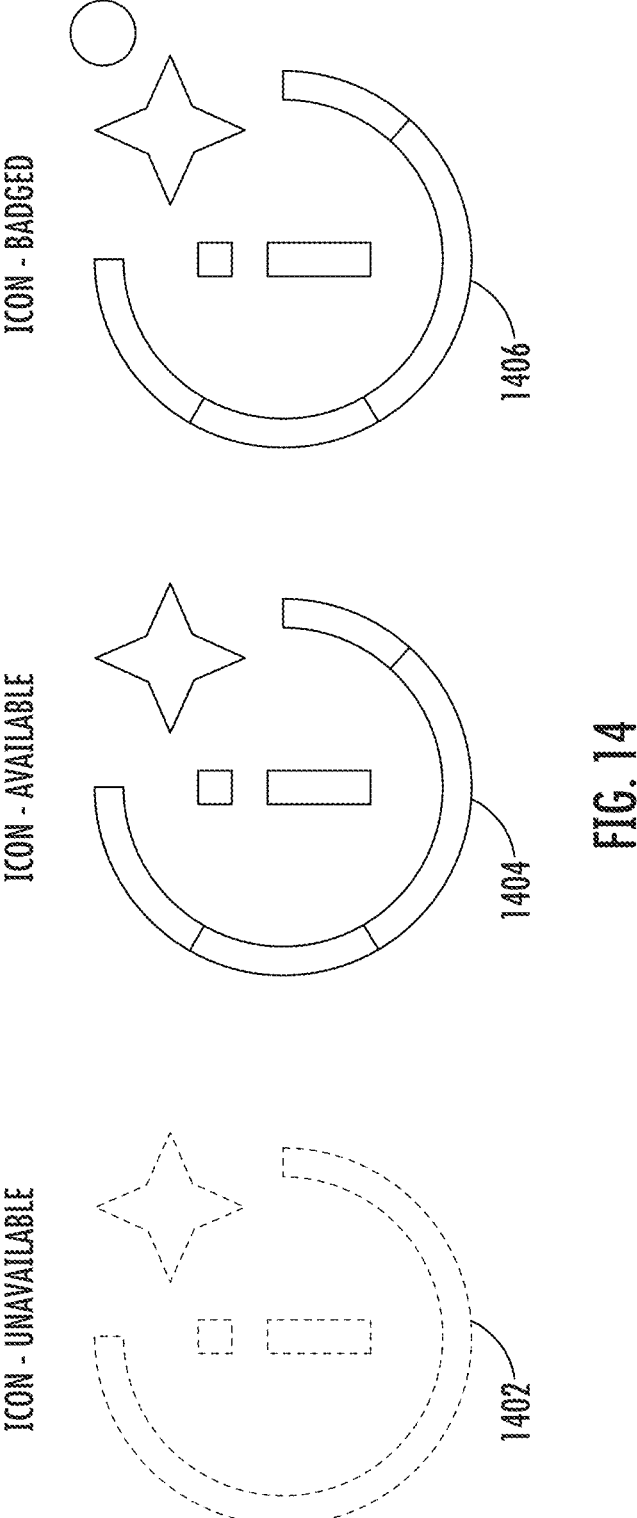
FIG. 14 depicts illustrations of example suggestion interface elements according to example embodiments of the present disclosure.

FIG. 14 depicts illustrations of example suggestion interface elements according to example embodiments of the present disclosure. The suggestion interface element can include an icon that may be displayed in different colors and/or with different badges based on one or more determinations. For example, a first state 1402 can include the icon in gray to indicate additional content has yet to be determined. The second state 1404 can include the icon in one or more other colors to indicate an additional content item has been determined and can be provided. In some implementations, a badge 1406 may be provided in the second state based on a high confidence level of correlation between the displayed content and the additional content.

Figure 15:
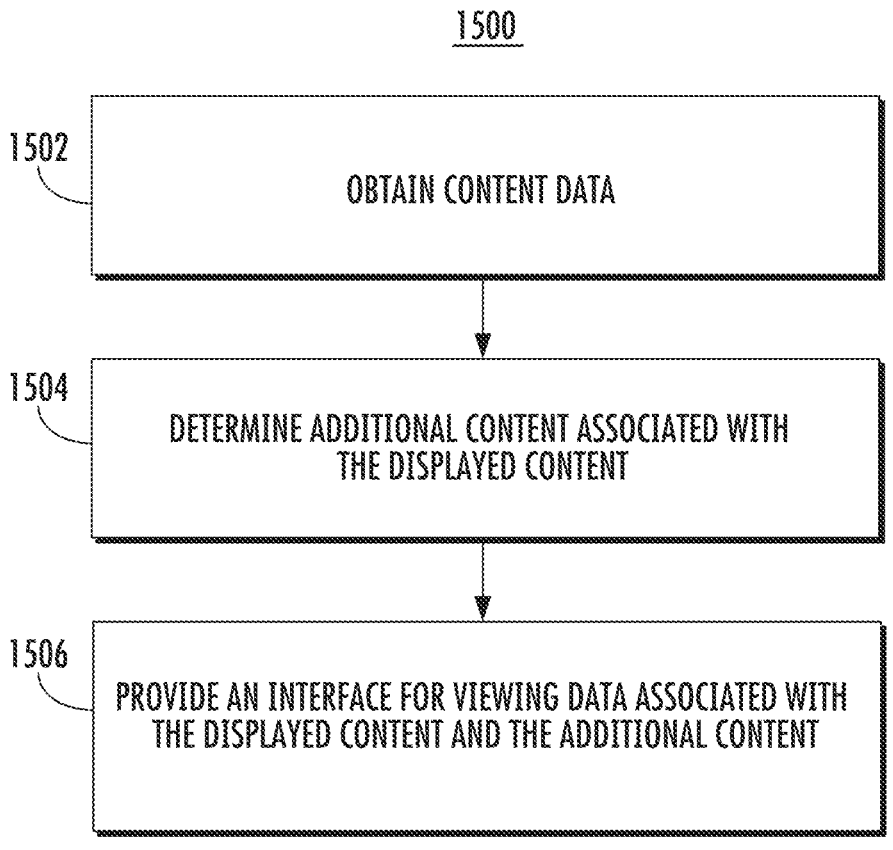
FIG. 15 depicts a flow chart diagram of an example method to perform additional content interface presentation according to example embodiments of the present disclosure.

FIG. 15 depicts a flow chart diagram of an example method to perform according to example embodiments of the present disclosure. Although FIG. 15 depicts steps performed in a particular order for purposes of illustration and discussion, the methods of the present disclosure are not limited to the particularly illustrated order or arrangement. The various steps of the method 1500 can be omitted, rearranged, combined, and/or adapted in various ways without deviating from the scope of the present disclosure.

At 1502, a computing system can obtain content data. The content data can include an indication of a displayed content provided for display to a user. In some implementations, the displayed content can be associated with the web page. The content data can include a uniform resource locator. The displayed content can include text data, image data, white space, structure data, and/or latent encoding data. The displayed content can be provided for display via a browser application, a messaging application, a social media application, and/or via a widget. The content data may be obtained via an overlay application, a browser extension, a built-in feature of an application, and/or an operating systems feature. The displayed content can be associated with a first web page. The first web page may be associated with a first web resource.

At 1504, the computing system can determine additional content associated with the displayed content. The additional content can be obtained based on the content data. The additional content can be determined by processing the content data during a presentation of the displayed content. In some implementations, the additional content can include a purchase link. The purchase link can be associated with a product associated with the displayed content. The additional content can include an augmented reality experience. The additional content can be associated with a second web page. The second web page can differ from the first web page. Additionally and/or alternatively, the additional content can be associated with a second web resource that differs from the first web resource.

In some implementations, determining the additional content associated with the displayed content can include determining a uniform resource locator associated with the displayed content and determining an additional web page associated with the uniform resource locator. Additionally and/or alternatively, additional content can be generated based on the additional web page.

In some implementations, determining the additional content associated with the displayed content can include determining a plurality of additional resources associated with the displayed content, determining a plurality of predicted actions associated with one or more resources of the plurality of additional resources, and generating a plurality of action interface elements. The plurality of action interface elements can be associated with the plurality of predicted actions. The plurality of action interface elements can be provided for display in the interface.

Alternatively and/or additionally, determining the additional content associated with the displayed content can include processing at least a portion of the displayed content with a machine learned model to determine a machine-learned output and determining the additional content based on the machine-learned output.

At 1506, the computing system can provide an interface for viewing data associated with the displayed content and the additional content. The interface can be provided in response to determining the additional content associated with the displayed content. The interface can include a web page viewer and a preview bubble. In some implementations, the web page viewer can provide a portion of the displayed content for display. The preview bubble can provide a snippet associated with the additional content. In some implementations, the interface can include a swipe-up interface element configured to display a portion of the additional content based on a user input. The interface can include a type indicator associated with a content type of the additional content. For example, the type indicator can be descriptive of action type, and the additional content can be associated with performing a particular action. Alternatively and/or additionally, the type indicator can be descriptive of an understanding type. The additional content can provide supplementary information for understanding a particular topic associated with the displayed content. The interface can include a selectable user interface element for providing the augmented reality experience. In some implementations, the interface can include a suggestion state. The suggestion state can include a viewing window that displays at least a portion of the displayed content. Additionally and/or alternatively, the suggestion state can include a suggestion interface element that indicates the determination of the additional content. The suggestion interface element can be selected, and an additional content preview window can be provided that is descriptive of at least a portion of the additional content. The additional content preview window can include one or more other additional content items in addition to the initially suggested additional content.

In some implementations, the interface can include a scroll indicator and a bubble interface element. The scroll indicator can indicate a position of a currently viewed portion of the displayed content with respect to other portions of the displayed content. Additionally and/or alternatively, the bubble interface element can be provided in the interface adjacent to the scroll indicator.

In some implementations, providing the interface for viewing data associated with the displayed content and the additional content can include providing at least a portion of the displayed content for display with a suggestion interface element, obtaining a selection of the suggestion interface element, and providing at least a portion of the additional content for display.

Additionally and/or alternatively, the systems and methods can include providing a suggestion interface element for display in a first state. The suggestion interface element can be descriptive of whether additional content has been determined. In response to determining the additional content associated with the displayed content, the systems and methods can provide the suggestion interface element for display in a second state. The second state can be descriptive of the additional content being determined.

In some implementations, the systems and methods can include obtaining input data. The input data can be descriptive of a selection of a suggestion interface element of the interface. The systems and methods can include providing a portion of the additional content for display.

Alternatively and/or additionally, the systems and methods can include processing a portion of the displayed content to generate semantic data. The semantic data can be descriptive of a semantic understanding of the portion of the displayed content. The systems and methods can include querying a database based at least in part on the semantic data. In some implementations, the additional content can be determined based on the querying of the database.

Figure 16:
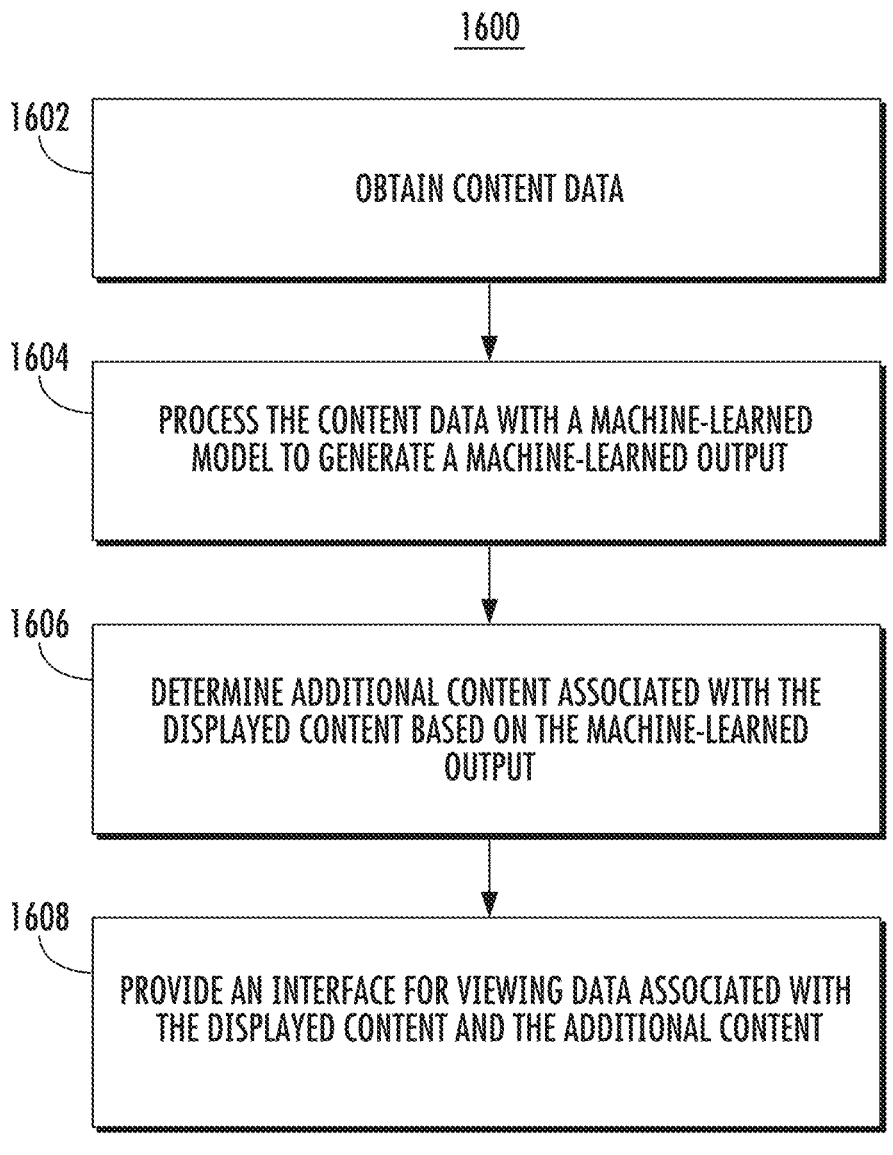
FIG. 16 depicts a flow chart diagram of an example method to perform additional content determination according to example embodiments of the present disclosure.

FIG. 16 depicts a flow chart diagram of an example method to perform according to example embodiments of the present disclosure. Although FIG. 16 depicts steps performed in a particular order for purposes of illustration and discussion, the methods of the present disclosure are not limited to the particularly illustrated order or arrangement. The various steps of the method 1600 can be omitted, rearranged, combined, and/or adapted in various ways without deviating from the scope of the present disclosure.

At 1602, a computing system can obtain content data. The content data can include an indication of a displayed content provided for display to a user. The content data can include data descriptive of the displayed content. The displayed content can include a web page and/or a document. The displayed content can be displayed in a browser application, a search application, and/or a dedicated application for a specific content type.

At 1604, the computing system can process the content data with a machine-learned model to generate a machine-learned model output. The machine-learned output can be descriptive of a semantic understanding of the displayed content. The machine-learned model can include a natural language processing model, a segmentation model, a classification model, a detection model, and/or an augmentation model. The machine-learned model can include a convolutional neural network, a feed forward neural network, a transformer model, and/or a recurrent neural network. The machine-learned model output can include an embedding, text data, image data, latent encoding data, audio data, and/or code.

At 1606, the computing system can determine additional content associated with the displayed content based on the machine-learned model output. The additional content can be obtained based on the content data. In some implementations, the additional content can be determined by processing the content data during a presentation of the displayed content. The additional content can include a summary. In some implementations, the additional content can include additional information and/or an additional action determined based on the machine-learned model output. The machine-learned model output can be descriptive of a semantic understanding of the displayed content, which can be utilized to determine additional content associated with the semantic understanding. In some implementations, the machine-learned model output can include a topic determination, which can be utilized to determine additional content associated with the topic.

At 1608, the computing system can provide an interface for viewing data associated with the displayed content and the additional content. The interface can be provided in response to determining additional content associated with the displayed content. In some implementations, the interface can include a viewing window that displays at least a portion of the displayed content. The interface can include a suggestion notification descriptive of the additional content.

Figure 17:
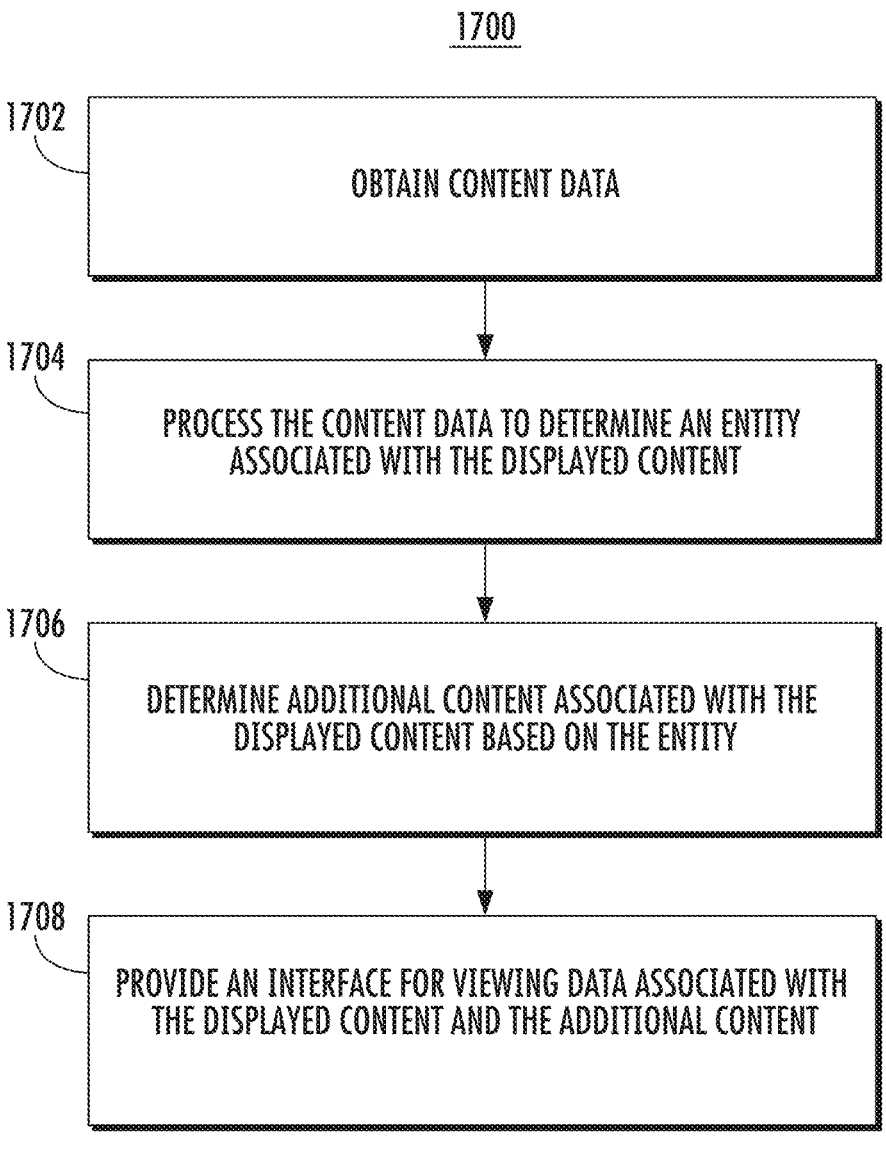
FIG. 17 depicts a flow chart diagram of an example method to perform entity-based additional content determination according to example embodiments of the present disclosure.

FIG. 17 depicts a flow chart diagram of an example method to perform according to example embodiments of the present disclosure. Although FIG. 17 depicts steps performed in a particular order for purposes of illustration and discussion, the methods of the present disclosure are not limited to the particularly illustrated order or arrangement. The various steps of the method 1700 can be omitted, rearranged, combined, and/or adapted in various ways without deviating from the scope of the present disclosure.

At 1702, a computing system can obtain content data. The content data can include an indication of a displayed content provided for display to a user. The content data can include data descriptive of displayed content. The displayed content can include a portion of a web page, a portion of a document, and/or other information provided for display.

At 1704, the computing system can process the content data to determine an entity associated with the displayed content. The entity can be determined based on the content in the displayed content (e.g., based on a title, an image in the displayed content, and/or information described in a body paragraph), based on data associated with the uniform resource locator, and/or based on an index look-up.

At 1706, the computing system can determine additional content associated with the displayed content based on the entity. The additional content can be obtained based on the content data. In some implementations, the additional content can be determined by processing the content data during a presentation of the displayed content. The additional content may be determined by generating a search query based on the entity, providing the search query to a search engine, and receiving one or more search results from the search engine.

At 1708, the computing system can provide an interface for viewing data associated with the displayed content and the additional content. The interface can include a viewing window that displays at least a portion of the displayed content. In some implementations, the interface can include a suggestion notification descriptive of the additional content.

Figure 18A:
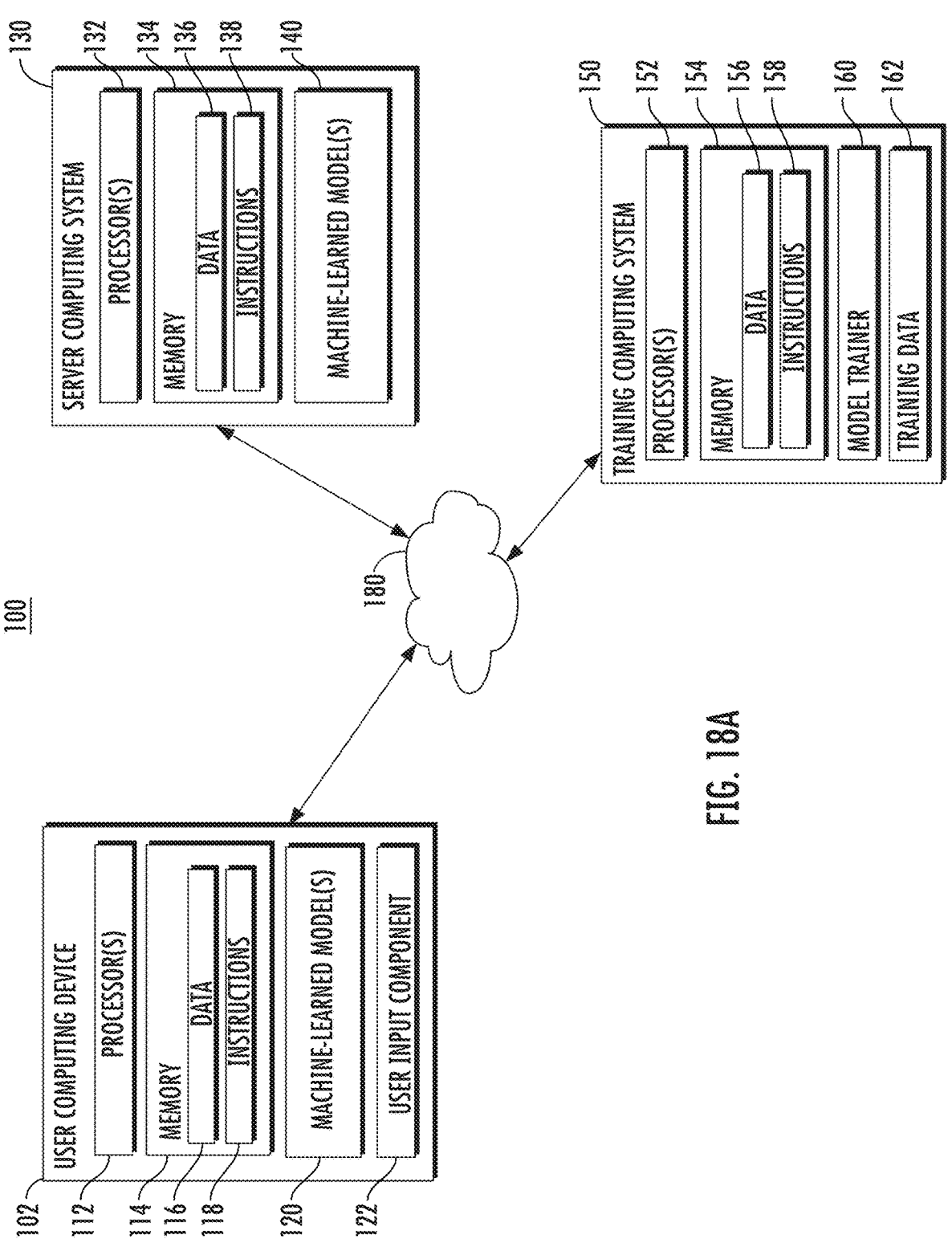
FIG. 18A depicts a block diagram of an example computing system that performs additional content interface presentation according to example embodiments of the present disclosure.

FIG. 18A depicts a block diagram of an example computing system 100 that performs additional content interface presentation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more content prediction models 120. For example, the content prediction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example content prediction models 120 are discussed with reference to FIGS. 2-11.

In some implementations, the one or more content prediction models 120 can be received from the server computing system 130 over network 180, stored in the user computing device memory 114, and then used or otherwise implemented by the one or more processors 112. In some implementations, the user computing device 102 can implement multiple parallel instances of a single content prediction model 120 (e.g., to perform parallel additional content prediction across multiple instances of displayed content items).

More particularly, the content prediction model 120 can be configured to process content data (e.g., a uniform resource locator, text data, image data, latent encoding data, and/or other metadata) to determine additional content associated with the displayed content. The additional content can be determined by generating semantic data associated with the displayed content and querying a database based on the semantic data. Alternatively and/or additionally the additional content can be determined by generating a search query based on the content data. In some implementations, a predicted action type can be determined, and the additional content can be determined based on the predicted action type.

Additionally or alternatively, one or more content prediction models 140 can be included in or otherwise stored and implemented by the server computing system 130 that communicates with the user computing device 102 according to a client-server relationship. For example, the content prediction models 140 can be implemented by the server computing system 140 as a portion of a web service (e.g., a content prediction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned content prediction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-11.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the content prediction models 120 and/or 140 based on a set of training data 162. The training data 162 can include, for example, example training data sets, which can include a training example and ground truth data. The training example can include example content data (e.g., a uniform resource locator, example text, example images, example latent encoding data, and/or an example embedding). The ground truth data can include a ground truth label, a ground truth prediction, a ground truth action type, a ground truth query, and/or a ground truth semantic data output.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 18A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 18B:
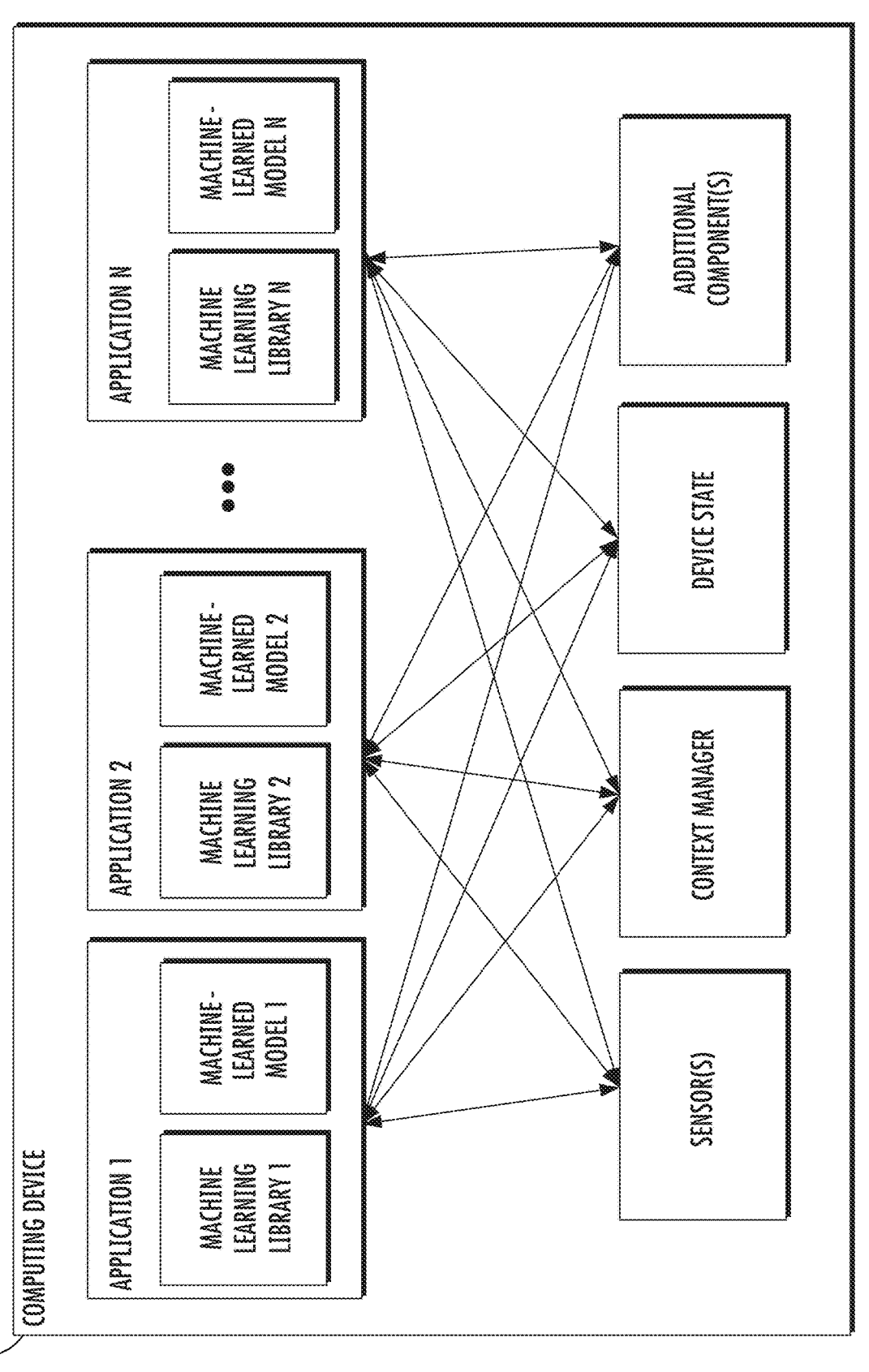
FIG. 18B depicts a block diagram of an example computing device that performs additional content interface presentation according to example embodiments of the present disclosure.

FIG. 18B depicts a block diagram of an example computing device 40 that performs according to example embodiments of the present disclosure. The computing device 40 can be a user computing device or a server computing device.

The computing device 40 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 18B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 18C:
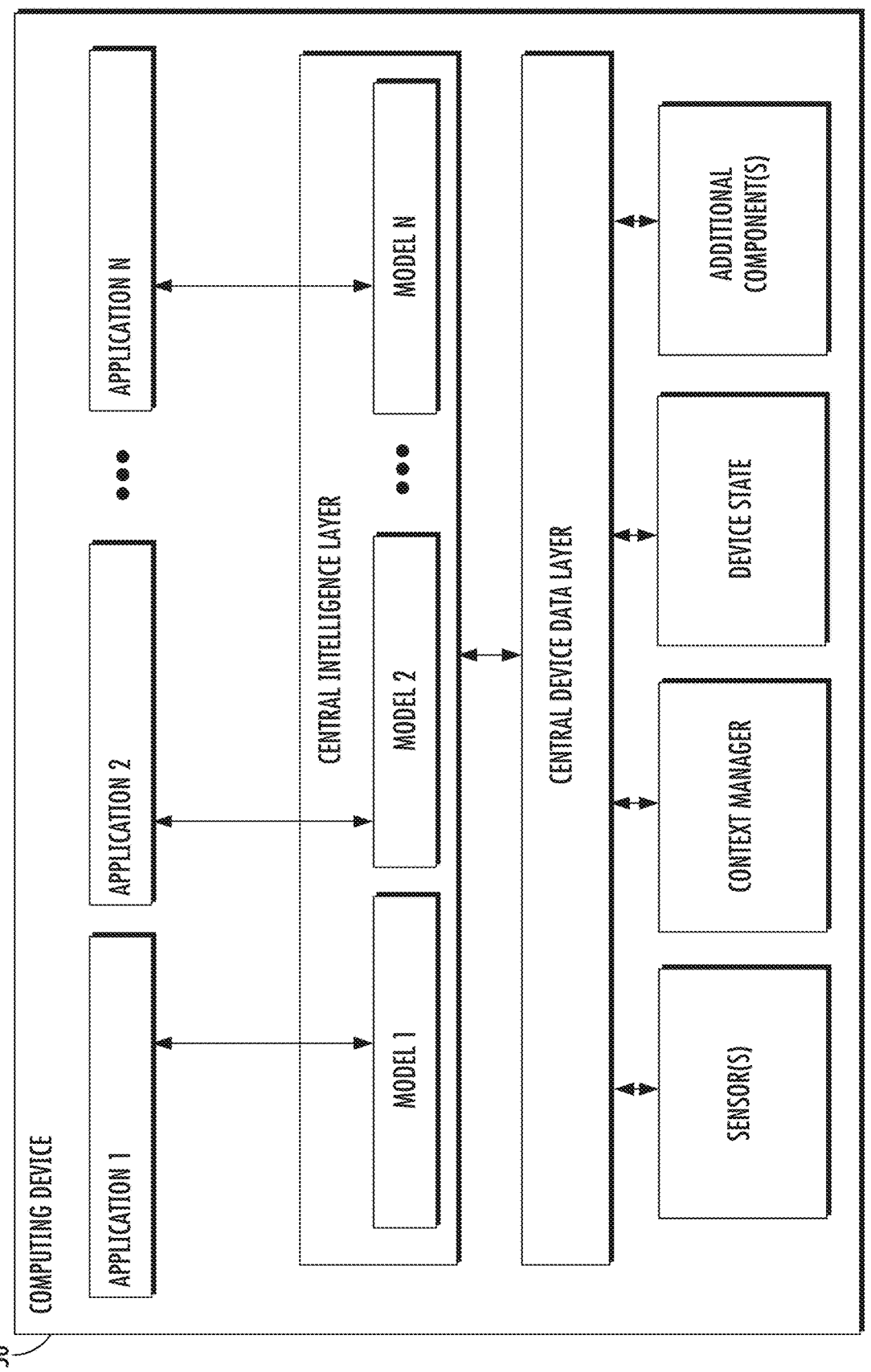
FIG. 18C depicts a block diagram of an example computing device that performs additional content interface presentation according to example embodiments of the present disclosure.

FIG. 18C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 18C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 18C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining content data, wherein the content data comprises an indication of a displayed content provided for display to a user;
determining additional content associated with the displayed content, wherein the additional content is obtained based on the content data, wherein the additional content is determined by processing the content data during a presentation of the displayed content;
in response to determining additional content associated with the displayed content, providing a suggestion interface element for display, wherein the suggestion interface element comprises a suggestion notification descriptive of additional content being determined;
obtaining a selection of the suggestion interface element; and
in response to obtaining the selection of the suggestion interface element, providing a swipe-up interface element for display with the displayed content for viewing data associated with the displayed content and the additional content, wherein the swipe-up interface element comprises a viewing window that displays at least a portion of the displayed content.

2. The system of claim 1, wherein determining the additional content associated with the displayed content comprises:
processing the content data to determine an action associated with the displayed content; and
determining additional content based on the action.

3. The system of claim 1, wherein additional content determination is performed automatically without prompting by a user.

4. The system of claim 1, wherein determining the additional content associated with the displayed content comprises:
processing the content data with a machine-learned model to generate a machine-learned model output.

5. The system of claim 4, wherein determining the additional content associated with the displayed content further comprises:
determining the additional content based on the machine-learned model output.

6. The system of claim 4, wherein the machine-learned model was trained to generate a summary of the displayed content to then be utilized to search a database.

7. The system of claim 4, wherein the machine-learned model comprises a natural language processing model trained for semantic understanding that processes the content data to generate a semantic understanding output, wherein the semantic understanding output is processed to determine other web resources associated with the semantic understanding.

8. The system of claim 1, wherein determining the additional content associated with the displayed content comprises:
processing the content data to determine an entity associated with the displayed content; and
determining the additional content based on the entity.

9. The system of claim 8, wherein determining the additional content based on the entity comprises:
generating a search query based on the entity; and
processing the search query with a search engine to determine the additional content associated with the entity.

10. The system of claim 8, wherein determining the additional content based on the entity comprises:
generating a search query based on the entity; and
searching a particular database with the search query to determine the additional content associated with the entity.

11. A computer-implemented method, the method comprising:
obtaining, by a computing system comprising one or more processors, content data, wherein the content data comprises an indication of a displayed content provided for display to a user;
determining, by the computing system, additional content associated with the displayed content, wherein the additional content is obtained based on the content data, wherein the additional content is determined by processing the content data during a presentation of the displayed content;
in response to determining additional content associated with the displayed content, providing, by the computing system, a suggestion interface element for display, wherein the suggestion interface element comprises a suggestion notification descriptive of additional content being determined;
obtaining, by the computing system, a selection of the suggestion interface element; and
in response to obtaining the selection of the suggestion interface element, providing, by the computing system, a swipe-up interface element for display with the displayed content for viewing data associated with the displayed content and the additional content, wherein the swipe-up interface element comprises a viewing window that displays at least a portion of the displayed content.

12. The method of claim 11, wherein determining, by the computing system, the additional content associated with the displayed content comprises:

determining, by the computing system, first additional content associated with a currently displayed portion of the displayed content, wherein the first additional content is obtained based on the content data, wherein the first additional content is determined by processing the content data during the presentation of the displayed content; and wherein providing, by the computing system, the suggestion interface element for display comprises:

providing, by the computing system, a bubble interface element with a scroll interface, wherein the bubble interface element is provided adjacent to a scroll indicator of the scroll interface, wherein the scroll indicator indicate a position of a currently viewed portion of the displayed content relative to the displayed content as a whole, and wherein the bubble interface element comprises a first snippet associated with the first additional content.

13. The method of claim 12, further comprising:

obtaining, by the computing system, a navigation input via the scroll interface;

providing, by the computing system, a second portion of the displayed content for display; and determining, by the computing system, second additional content associated with the second portion of the displayed content.

14. The method of claim 13, further comprising:

providing, by the computing system, an updated bubble interface element with the scroll interface, and wherein the updated bubble interface element comprises a second snippet associated with the second additional content.

15. The method of claim 12, wherein the bubble interface element moves in unison with the scroll indicator.

16. The method of claim 12, wherein the bubble interface element comprises the first snippet and an image associated with the first additional content.

17. One or more non-transitory computer-readable media that collectively store instructions that, when executed by one or more computing devices, cause the one or more computing devices to perform operations, the operations comprising:

obtaining content data, wherein the content data comprises an indication of a displayed content provided for display to a user;

determining additional content associated with the displayed content, wherein the additional content is obtained based on the content data, wherein the additional content is determined by processing the content data during a presentation of the displayed content;

in response to determining additional content associated with the displayed content, providing a suggestion interface element for display, wherein the suggestion interface element comprises a suggestion notification descriptive of additional content being determined;

obtaining a selection of the suggestion interface element; and in response to obtaining the selection of the suggestion interface element, providing a swipe-up interface element for display with the displayed content for viewing data associated with the displayed content and the additional content, wherein the swipe-up interface element comprises a viewing window that displays at least a portion of the displayed content.

18. The one or more non-transitory computer-readable media of claim 17, wherein determining the additional content associated with the displayed content comprises:

determining a plurality of additional resources associated with the displayed content;

determining a plurality of predicted actions associated with one or more resources of the plurality of additional resources; and generating a plurality of action interface elements, wherein the plurality of action interface elements are associated with the plurality of predicted actions;

wherein the plurality of action interface elements are provided for display in the interface.

19. The one or more non-transitory computer-readable media of claim 17, wherein the interface comprises a scroll indicator and a bubble interface element, wherein the scroll indicator indicates a position of a currently viewed portion of the displayed content with respect to other portions of the displayed content, and wherein the bubble interface element is provided in the interface adjacent to the scroll indicator.

20. The one or more non-transitory computer-readable media of claim 17, wherein the suggestion interface element comprises a type indicator associated with an content type of the additional content, wherein the type indicator is descriptive of action type, wherein the additional content is associated with performing a particular action.

* * * * *